US008447541B2

(12) United States Patent
Rada et al.

(10) Patent No.: US 8,447,541 B2
(45) Date of Patent: May 21, 2013

(54) ENERGY USAGE MONITORING WITH REMOTE DISPLAY AND AUTOMATIC DETECTION OF APPLIANCE INCLUDING GRAPHICAL USER INTERFACE

(75) Inventors: Patrick A. Rada, San Jose, CA (US); John H. Magnasco, San Jose, CA (US)

(73) Assignee: Geneva Cleantech Inc., San Jose, CA (US)

( * ) Notice: Subject to any disclaimer, the term of this patent is extended or adjusted under 35 U.S.C. 154(b) by 346 days.

(21) Appl. No.: 12/694,171

(22) Filed: Jan. 26, 2010

(65) Prior Publication Data
US 2010/0191487 A1 Jul. 29, 2010

Related U.S. Application Data

(60) Provisional application No. 61/298,112, filed on Jan. 25, 2010, provisional application No. 61/298,127, filed on Jan. 25, 2010, provisional application No. 61/206,051, filed on Jan. 26, 2009, provisional application No. 61/206,072, filed on Jan. 26, 2009.

(51) Int. Cl.
*G01R 21/06* (2006.01)
(52) U.S. Cl.
USPC ............... 702/60; 62/130; 62/182; 62/188
(58) Field of Classification Search
USPC .................. 705/63, 412; 702/60, 62, 64, 81, 702/130, 176, 182, 188–189; 700/83, 295, 700/297; 361/437
See application file for complete search history.

(56) References Cited

U.S. PATENT DOCUMENTS

| | | | |
|---|---|---|---|
| 4,858,141 A | 8/1989 | Hart et al. | 364/483 |
| 4,990,893 A | 2/1991 | Kiluk | 340/573 |
| 5,196,982 A | 3/1993 | Landsberg et al. | 361/93 |
| 5,231,347 A | 7/1993 | Voisine et al. | 324/142 |
| 5,325,051 A | 6/1994 | Germer et al. | 324/142 |
| 5,384,712 A | 1/1995 | Oravetz et al. | 364/550 |
| 5,483,153 A | 1/1996 | Leeb et al. | 324/76.12 |
| 5,815,416 A | 9/1998 | Liebmann et al. | 364/578 |
| 5,890,097 A | 3/1999 | Cox | 702/67 |

(Continued)

FOREIGN PATENT DOCUMENTS
RU 2131611 10/1999

OTHER PUBLICATIONS

Berges, Mario, Ethan Goldman, H. Scott Matthews, and Lucio Soibelman, *Training Load Monitoring Algorithms on Highly Sub-Metered home Electricity Consumption Data*, pp. 1-6.

(Continued)

*Primary Examiner* — Elias Desta
(74) *Attorney, Agent, or Firm* — Haverstock & Owens, LLP

(57) ABSTRACT

Devices and methods for identifying an electrical device, and its state, in a network of electrical devices are disclosed. An energy monitoring device is programmed to identify an electrical device coupled to a power supply, and a state of the electrical device, from a change in successive measurements of the power supply. Algorithms for determining a load signature for an electrical device and its state are disclosed. A stored table of load signatures for states is used to identify devices, and states. Energy monitoring information is collected and presented to the user on a display, a remote display, or is transmitted over a network to a remote device such as a personal computer, personal digital assistant, an iPhone, a cell phone, voice mail, email, or text message.

39 Claims, 16 Drawing Sheets

U.S. PATENT DOCUMENTS

| | | | | |
|---|---|---|---|---|
| 6,147,475 | A | 11/2000 | Bridgeman | 323/211 |
| 6,148,623 | A | 11/2000 | Park et al. | 62/129 |
| 6,330,516 | B1 | 12/2001 | Kammeter | 702/60 |
| 6,483,290 | B1 | 11/2002 | Hemminger et al. | 324/142 |
| 6,507,669 | B1 | 1/2003 | Klassen | 382/170 |
| 6,577,962 | B1 | 6/2003 | Afshari | 702/61 |
| 6,618,709 | B1 | 9/2003 | Sneeringer | 705/412 |
| 6,633,823 | B2 | 10/2003 | Bartone et al. | 702/57 |
| 6,636,893 | B1 | 10/2003 | Fong | 709/223 |
| 6,853,958 | B1 | 2/2005 | Turin et al. | 702/188 |
| 6,868,293 | B1 | 3/2005 | Schurr et al. | 700/22 |
| 6,946,972 | B2 | 9/2005 | Mueller et al. | 340/870.02 |
| 6,968,295 | B1 | 11/2005 | Carr | 702/188 |
| 6,993,417 | B2 | 1/2006 | Osann, Jr. | |
| 7,043,459 | B2 | 5/2006 | Peevey | 705/412 |
| 7,054,769 | B2 | 5/2006 | Cox | 702/60 |
| 7,135,956 | B2 | 11/2006 | Bartone et al. | 340/3.9 |
| 7,162,379 | B2 | 1/2007 | Jang et al. | 702/60 |
| 7,208,697 | B2 | 4/2007 | Blankenship et al. | 219/130.21 |
| 7,230,972 | B2 | 6/2007 | Cornwall et al. | 375/134 |
| 7,250,874 | B2 | 7/2007 | Mueller et al. | 340/870.06 |
| 7,265,533 | B2 | 9/2007 | Lightbody et al. | 324/158.1 |
| 7,272,518 | B2 * | 9/2007 | Bickel et al. | 702/61 |
| 7,282,921 | B2 | 10/2007 | Sela et al. | 324/522 |
| 7,289,887 | B2 | 10/2007 | Rodgers | 700/295 |
| 7,317,404 | B2 | 1/2008 | Cumeralto et al. | 340/870.02 |
| 7,349,766 | B2 | 3/2008 | Rodgers | 700/295 |
| 7,451,019 | B2 | 11/2008 | Rodgers | 700/295 |
| 7,453,267 | B2 | 11/2008 | Westbrock, Jr. et al. | 324/522 |
| 7,459,864 | B2 | 12/2008 | Lys | 315/291 |
| 7,483,797 | B2 * | 1/2009 | Nambu | 702/60 |
| 7,541,941 | B2 | 6/2009 | Bogolea et al. | |
| 7,561,681 | B2 | 7/2009 | Booth et al. | 379/106.03 |
| 7,590,499 | B2 | 9/2009 | Ha et al. | 702/60 |
| 7,594,150 | B2 | 9/2009 | Smith et al. | 713/150 |
| 7,606,639 | B2 | 10/2009 | Miyaji | 700/296 |
| 7,639,000 | B2 | 12/2009 | Briese et al. | 324/142 |
| 7,646,308 | B2 | 1/2010 | Paoletti et al. | 340/635 |
| 7,653,499 | B2 | 1/2010 | Corrado et al. | 702/61 |
| 2003/0050737 | A1 | 3/2003 | Osann, Jr. | 700/276 |
| 2005/0043907 | A1 | 2/2005 | Eckel et al. | |
| 2008/0077336 | A1 | 3/2008 | Fernandes | 702/57 |
| 2008/0106241 | A1 | 5/2008 | Deaver et al. | |
| 2008/0150718 | A1 | 6/2008 | Apfel | 340/568.2 |
| 2008/0224892 | A1 | 9/2008 | Bogolea et al. | |
| 2008/0262820 | A1 | 10/2008 | Nasle | 703/18 |
| 2008/0306985 | A1 | 12/2008 | Murray et al. | 707/102 |
| 2009/0033296 | A1 | 2/2009 | Hammerstrom | 323/207 |
| 2009/0045804 | A1 | 2/2009 | Durling et al. | |
| 2009/0072985 | A1 | 3/2009 | Patel et al. | |
| 2009/0195349 | A1 | 8/2009 | Frader-Thompson et al. | 340/3.1 |
| 2009/0206059 | A1 | 8/2009 | Kiko | |
| 2010/0026096 | A1 | 2/2010 | Yeh et al. | 307/39 |
| 2010/0060291 | A1 | 3/2010 | Grommes | 324/537 |
| 2010/0060479 | A1 | 3/2010 | Salter | 340/870.4 |
| 2010/0067271 | A1 | 3/2010 | Garces et al. | 363/95 |
| 2010/0070213 | A1 | 3/2010 | Anklam | 702/60 |
| 2010/0070216 | A1 | 3/2010 | Murata | 702/61 |
| 2010/0070217 | A1 | 3/2010 | Shimada et al. | 702/62 |
| 2010/0070218 | A1 | 3/2010 | Hyde et al. | 702/62 |
| 2010/0070225 | A1 | 3/2010 | Hyde et al. | 702/76 |
| 2010/0070227 | A1 | 3/2010 | Hyde et al. | 702/77 |
| 2010/0070785 | A1 | 3/2010 | Fallin et al. | 713/320 |

OTHER PUBLICATIONS

Petersen Dane, Jay Steele and Joe Wilkerson, *WattBot: A Residential Electricity Monitoring and Feedback System*, CHI 2009—Student Design Competition, Apr. 4-9, 2009, Boston, MA.

Zhang, Yuejun and Wu Mingguang, *Design of Wireless Remote Module in X-10 Intelligent Home*, Industrial Technology, 2005, IEEE International Conference, Dec. 14-17, 2005, pp. 1349-1353.

Lisovich, Mikhail A. and Stephen B, Wicker, Privacy Concerns in Upcoming Residential and Commercial Demand-Response Systems, IEEE Proceedings on Power Systems, vol. 1, No. 1, Mar. 2008, pp. 1-10.

International Search Report and Written Opinion dated Mar. 12, 2010, PCT Application No. PCT/US2010/22140, filed Jan. 26, 2010, Geneva CleanTech Inc.

"Advanced Metering Infrastructure (AMI)", Electric Power Research Institute, Feb. 2007, p. 1-2, <URL: http:www.epri.com>.

Drenker, Steven and Ab Kader, Nonintrusive Monitoring of Electric Loads, IEEE Computer Applications in Power, Oct. 1999, p. 47-51.

Laughman, Christopher, Kwangduk Lee, Robert Cox, Steven Shaw, Steven Leeb, Les Norford, and Peter Armstrong, "Power Signature Analysis", IEEE Power & Energy Magazine, Mar./Apr. 2003, p. 56-63.

"Single Point End-use Energy Disaggregation Speed for Energy Use Analysis", Enetics, Oct. 21, 2001, p. 1-5, <URL: http:www.enetics.com>.

The American Council for an Energy-Efficient Economy, Emerging Technologies Report ,Jan. 2007, p. 1-5.

Rossi, Todd M., Commercial RTU Diagnostics: Transforming the HVAC Service Market, Field Diagnostic Services, Inc., 2007 National Symposium on Market Transformation, "Accelerating the Pace: Deepening and Broadening Efficiency Efforts", Jan. 2007, p. 1-22.

Mulligan, Deirdre K., Privacy Considerations in Demand Response Energy Systems, UCB, client first became aware of this article Apr. 2011, p. 1-23.

Green Phy, HomePlug Powerline Alliance, client first became aware of this article Apr. 2011, p. 1-4.

HomePlug AV White Paper, HomePlug Powerline Alliance, Jan. 2005, p. 1-11.

Guy et al., Pathways to 'Smarter' Utility Meters: the Socio-Technical Shaping of New Metering Technologies. Electronic Working Paper No. 23, University of Newcastle upon Tyne, School of Architecture, Planning & Landscape, Global Urban Research Unit. Published Dec. 1995. Retrieve fro m internet <URL:hhttp://www.ncl.ac.uk/guru/assets/documents/ewp23.pdf>.

International Search Report for PCT Application No. PCT/US2012/022430 dated Jan. 24, 2012.

\* cited by examiner

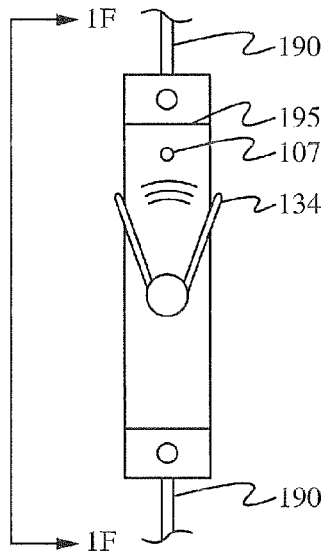
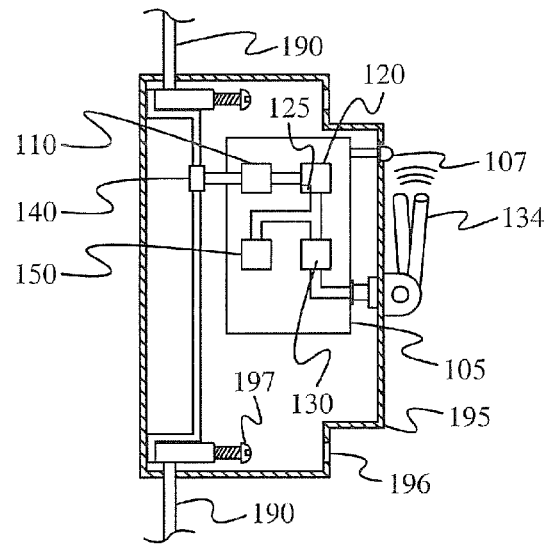
Fig. 1E          Fig. 1F
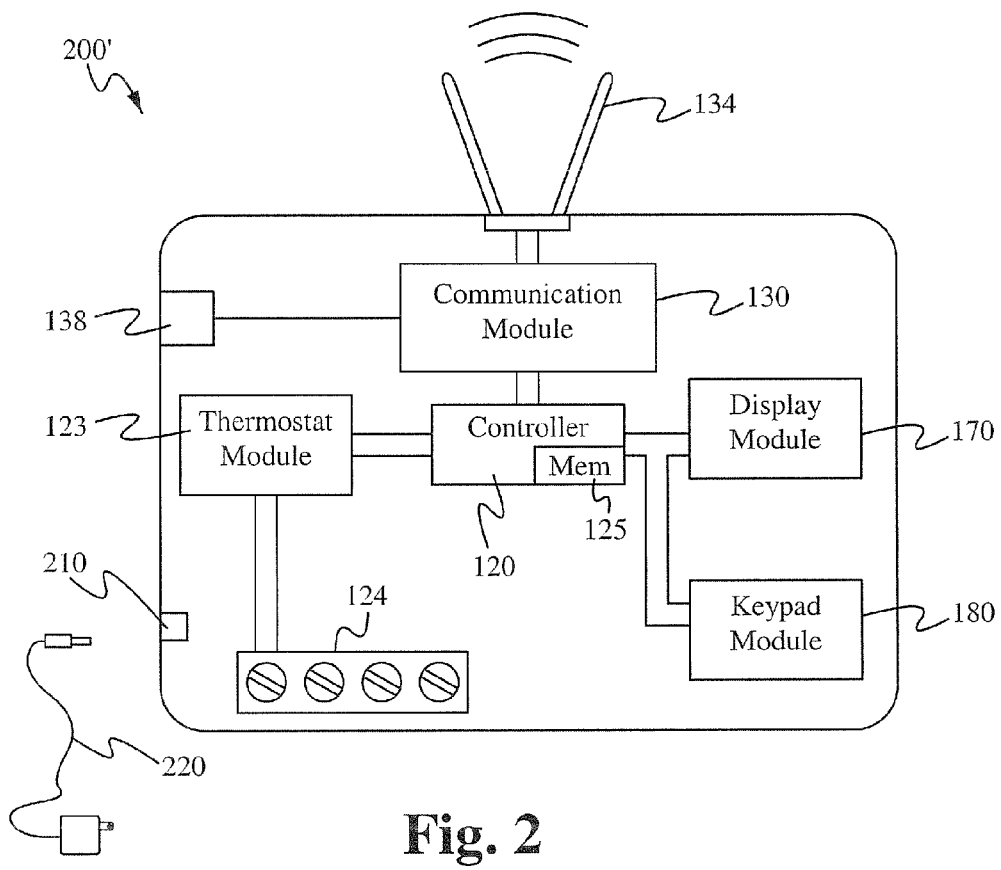
Fig. 2

400

| Public Usage Database | | | | | |
|---|---|---|---|---|---|
| IP Address | Zip Code | User Type | Sq.Ft. | Usage Type | Total KWH |
| 128.0.0.128 | 12345-7890 | Residence | 1750 | Electronics | 56 |
| 128.0.0.128 | 12345-7890 | Residence | 1750 | Appliances | 550 |
| 128.0.0.128 | 12345-7890 | Residence | 1750 | Heating/cooling | 750 |
| 128.0.0.128 | 12345-7890 | Residence | 1750 | Lighting | 450 |
| 12.34.56.78 | 12345-7890 | Business | 9500 | Electronics | 750 |
| 12.34.56.78 | 12345-7890 | Business | 9500 | Heating/cooling | 1200 |
| 12.34.56.78 | 12345-7890 | Business | 9500 | Lighting | 500 |
| 12.34.56.78 | 12345-7890 | Business | 9500 | Office Equipment | 2500 |
| 85.0.1.237 | 12345-8000 | Industrial | 20000 | Drill press | 5000 |
| 410 | 420 | 430 | 440 | 450 | 460 |

| Public Load Signature Database | | | | | |
|---|---|---|---|---|---|
| Mfr. | Model | Description | State | Voltage | Load Sig. |
| Phillips® | MO699SST | Microwave | Defrost | 110 | |
| Generic | Drill | ¼ HP hand drill | ON – FAST | 110 | |
| Generic | A/C Unit | 12000 BTU portable | ON - HIGH | 110 | |
| Generic | Light Bulb | 40W incandescent | ON | 110 | |
| Generic | Coffee maker | 10 cup, drip brew | BREWING | 110 | |
| Samsung® | LN0B750 | 40" LCD television | On | 110 | |
| Samsung® | LN0B750 | 40" LCD television | Standby | 110 | |
| Maytag® | MHWE950WW | Washer | Fill | 110 | |
| Maytag® | MHWE950WW | Washer | Wash | 110 | |
| Maytag® | MHWE950WW | Washer | Rinse | 110 | |
| Maytag® | MHWE950WW | Washer | Spin | 110 | |
| Maytag® | MEDE900VW | Dryer, electric | Dry – High heat | 220 | |
| Maytag® | MEDE900VW | Dryer, electric | Dry – Medium heat | 220 | |
| Maytag® | MEDE900VW | Dryer, electric | Dry – Tumble | 220 | |
| Maytag® | MEDE900VW | Dryer, electric | Off | 220 | |
| Sylvania® | 60W | Incandescent bulb | On | 110 | |
| Sylvania® | 60W | Incandescent bulb | Off | 110 | |
| Toshiba® | LT-1000 | Laptop computer | On | 110 | |
| Toshiba® | LT-1000 | Laptop computer | Standby | 110 | |
| Toshiba® | LT-1000 | Laptop computer | Off | 110 | |

ENERGY USAGE MONITORING WITH REMOTE DISPLAY AND AUTOMATIC DETECTION OF APPLIANCE INCLUDING GRAPHICAL USER INTERFACE

CROSS-REFERENCE TO RELATED APPLICATIONS

This application claims the benefit of U.S. Provisional Patent Application Ser. No. 61/206,072, filed Jan. 26, 2009 and entitled "ENERGY USAGE MONITORING WITH REMOTE DISPLAY AND AUTOMATIC DETECTION OF APPLIANCE INCLUDING GRAPHICAL USER INTERFACE", under 35 U.S.C. §119(e), U.S. Provisional Patent Application Ser. No. 61/298,127, filed Jan. 25, 2010, and entitled "AUTOMATIC DETECTION OF APPLIANCES", under 35 U.S.C. §119(e), U.S. Provisional Patent Application Ser. No. 61/206,051, filed Jan. 26, 2009 and entitled "POWER FACTOR AND HARMONIC CORRECTION METHODS", under 35 U.S.C. §119(e), U.S. Provisional Patent Application Ser. No. 61/298,112, filed Jan. 25, 2010 and titled "POWER FACTOR AND HARMONIC CORRECTION METHODS", under 35 U.S.C. §119(e), and U.S. Non-provisional patent application Ser. No. 12/694,153, filed Jan. 26, 2010, by inventors Patrick A. Rada and John H. Magnasco, and titled "POWER FACTOR AND HARMONIC CORRECTION METHODS," all of which are hereby incorporated by reference in their entirety for all purposes.

FIELD OF THE INVENTION

The present invention relates to the field of monitoring energy usage. More specifically, the present invention relates to monitoring the detailed energy usage of an electrical device in a network of electrical devices such as in a home or small office from a single point in the network.

BACKGROUND OF THE INVENTION

Department of Energy studies have shown as much as 15% reduction in energy usage just by making consumers aware of how much energy they are using and the costs associated with their energy usage. An analogous result has been shown in the hybrid automobile market. A hybrid vehicle driver can increase their gas mileage and reduce their energy usage by utilizing feedback provided to the driver as to their usage. Energy consumers have also become aware of the environmental impact of their energy usage, often expressed as a "carbon footprint." Thus, reduction in energy usage translates into both economic and ecological benefits for energy users. But, in order to make choices on how best to reduce usage, an energy user needs relevant energy usage information about the devices and usage patterns comprising his energy usage.

Current solutions for reducing home and office energy usage include monitoring total, aggregate power usage of a plurality of electrical devices at a single power supply point, monitoring power usage at one or more wall outlet power supply points, controlling the state of individual devices through timed, programmatic control of devices, and manually controlling devices by observing that one or more electrical devices are on, but not in use, and switching the device(s) off.

Aggregate Power Monitoring

The simplest, and most widespread, aggregate power usage monitoring system found in the prior art is a power utility monitoring the total usage of a customer via a power meter located at the customer's supply point, located near the branch off of the main distribution grid. The power meter accumulates total power used, the meter is actually read once per fixed period, such as a month, and the customer is billed for the power that the customer used in that billing period. Utilities have billing rates which are tiered, where a higher rate is charged per kilowatt hour (KWH) after a certain usage threshold is reached. Some tariff schedules charge a higher rate per KWH based upon usage a peak demand times. Utility bills will often breakdown the total power usage in accordance with the tariff schedule to show customers how much power was charged at each tariff rate. With this information, there are few facts available to a customer with which to make power saving decisions.

Newer aggregate monitoring systems can comprise a customer power meter downstream of the utility meter. The customer power meter is usually installed at, or near, the customer's main circuit breaker downstream of the utility meter. The customer power meter reads the total amount of power being used by the customer at specified increments, and shows this value on a display. The meter information may be transmitted to a personal computer where the power meter readings can be processed. One example of such a device is "WATTSON", made by DIY KYOTO in London, England. A corresponding product, "HOLMES", also made by DIY KYOTO, processes the information received from WATTSON to give the customer a more granular view of their total power consumption with respect to the time of day. However, this still only gives the customer a view of total power used, and how the total power usage is distributed in time over the billing period.

Monitoring Power Usage at Each Power Outlet

Another method of monitoring power usage is to monitor the usage at each power outlet in a power distribution system. In some example products, an electrical device plugs into the power outlet monitor which in turn plugs into the wall power outlet. The power outlet monitor may comprise an LCD display for displaying the total KWH used, the cost of such usage, and the current voltage, amperage, watts, Hz, and volt-amps active on the outlet. An example product is "Kill A Watt™" made by P3 International. This device enables a user to monitor power usage at a particular wall outlet via an LCD display, but the data is not stored for retrieval and analysis. The "Energy Logger and Power Usage Analyzer" made by Extech further comprises storage for data logging, wherein usage data can be stored and later transferred to a personal computer by an on-board memory in the energy logger. If an energy user has more than one Extech logger, the power usage information acquired by each logger is not aggregated. Collection of power usage data requires manual retrieval of the memory card in each wall outlet power monitor and retrieval of the information from each card with a computing device having memory card reading capability, before the data can be analyzed. Further, the usage data is only as granular as the device count per outlet. For example, if a multi-outlet power strip, with devices plugged into each outlet, is plugged into a wall outlet power monitor, the power usage for each device is not measured. Moreover, the cost to measure the power can become impractically high as each power outlet monitor may cost $50.00 or more, and one such device is required for every power outlet to be monitored. The large initial hardware cost of monitoring equipment, the inconvenience of manually retrieving and reading each outlet monitor memory card, and the indeterminate savings based on reduced power usage, if any, make monitoring power usage at each power outlet an impractical solution to reducing energy usage.

Monitoring Usage at Each Circuit Breaker

Yet another method of monitoring aggregate power usage is to monitor the usage at each circuit breaker, thereby monitoring the power usage at each circuit. Such a system, with an associated iPhone® application is named WattBot, described in the *CHI* 2009—*Student Design Competition* entry by Dane Peterson, Jay Steele and Joe Wilkerson. In their paper, *WattBot: A Residential Electricity Monitoring and Feedback System*, the authors describe a system similar to DIY KYOTO's Wattson, described above, except that WattBot measures the power used by each circuit of a house, rather than measuring the usage of power for the whole house. Energy information is displayed on the iPhone®. WattBot requires hardware to sense and monitor the energy used on each circuit, and WattBot does not give detailed usage information for a single electrical device unless the electrical device is dedicated to a single circuit on the circuit breaker for the house. Even if a single circuit is dedicated to a single device, WattBot does not give detailed energy usage by each state of the electrical device.

Manual Monitoring and Control

A consumer of electrical power can always walk through their home or office periodically, making note of devices which appear to be on but not in use, and turning off those devices in order to reduce power usage. While this method may save money without an associated equipment cost, no data is acquired for analysis of devices deemed appropriate to be left on or devices improperly seen as being off, when in fact they are actually consuming power. Importantly, many modern electronic devices have a "standby" state which consumes power without giving the visible appearance of the device being powered on. Thus, a consumer manually monitoring their devices would not know the cost or effect of power usage associated with devices appearing to be off, but in fact consuming energy in standby mode.

Programmatic Control of Individual Devices

Yet another method of reducing energy consumption is to programmatically control one or more devices to ensure that the devices are turned off when non-use is anticipated. For example, a system for programmatically controlling electrical devices may schedule a certain device, such as an overhead light in the den, to be off between the hours of 11 p.m. and 6 a.m. because it is anticipated that the den will not be used during those hours. Such systems require control circuits for each outlet or power control, such as a dimmer or switch, and a central controller to manage the electrical device network programming. For example, INSTEON® Smartlabs design products, sold by Smarthome™, can comprise INSTEON® network controllable devices such as dimmers, switches, thermostat controls, and appliance outlets using a device network protocol such as INSTEON® or X10 protocol, or a combination of both, coupled to a central controller. Such a system has the benefit of programmatically controlling the operation of electrical devices, but it requires a substantial commitment to hardware, installation and associated costs without any identified cost-saving information reported to the user to make decisions on how to reduce their power usage.

Current solutions for reducing home and office energy usage include monitoring total, aggregate power usage of a network of electrical devices at a single power supply point, monitoring power usage at one or more wall outlet power supply points, controlling the state of individual devices through programmatic control, and manually observing that one or more electrical devices are on, but not in use, and switching the device(s) off Monitoring power usage at the supply point does not provide sufficient information regarding the power consumed by electrical devices in order to determine power usage associated with a specific device. Solutions which monitor power usage at the power outlet either do not aggregate power usage information for analysis or aggregate such information only by manual means and at a high equipment cost. Even if automated aggregation of usage information were available, a substantial investment in monitoring equipment is required by the current means. The prior art lacks a low cost, effective means to provide detailed energy usage information regarding individual electrical devices in a home or business. The prior art further lacks an effective means to aggregate detailed energy usage information regarding individual devices for presentation to an energy user so that the energy user can make meaningful changes in their energy usage behavior to reduce energy usage and energy costs.

SUMMARY OF THE INVENTION

An energy monitoring device is disclosed which provides low cost, real-time monitoring of energy usage of each electrical device in a home or business from a single, central location with no requirement for additional hardware or wiring any electrical devices in the home or business. In an ultra-compact implementation, the energy monitoring device is able to comprise a single integrated circuit or chip, programmed with the features described below. The energy monitoring device is installed downstream of the utility energy meter, upstream of the circuit breaker panel, upstream of the network of electrical devices installed in the home or business, and without any additional connection to the electrical devices. In an alternative embodiment, the energy monitoring device is installed in an open slot in the circuit breaker panel in the same form factor of a typical circuit breaker unit. The energy monitoring device is able to automatically detect when loads are turned on or off and can identify which load was switched on or off. Loads are identified by detecting a load signature for each state of each electrical device installed in the electrical network of devices. Each electrical device in the network of electrical devices is able to be identified by its load signatures and states. The state, and load signature for each state, of an electrical device is able to be acquired during a learning phase. The learning phase can be automated or performed with manual steps. To facilitate the manual learning phase, a user of the energy monitoring device is able to populate a data store with information about the location and characteristics of the electrical devices in the home or small business. This private information is able to be stored in a private database comprising a list of electrical devices, rooms of the house or small business, and possible states of the electrical devices. The process of populating the data store of private information is able to be facilitated by an application running on a portable electronic device such as a SmartPhone, a cellular phone, a personal digital assistance, or other portable device comprising a user display and user input interface. The private database is able to be downloaded to the energy monitoring device via a communications connector on the energy monitoring devices, or via a network connection, wired or wireless. The more devices and states which a user pre-identifies, the easier the manual learning phase will be. Private database and private information refer to information generated by a particular energy monitoring device, information related to the persons, devices, structure or attributes of any of these, where a particular energy monitoring device is installed. Examples of private information include the name of users in a home or business structure in which an energy monitoring device is installed, the specific devices installed in the structure, the rooms in the structure, the usage information generated by a user when the user does not intend to share the usage information, the user's power bill, et al. "Public database" and "public information" refer to information generated for use by the public, accessible to the public, or generated by the public. Examples of public information include load signatures for devices and states created for public use or public access, public usage information which a user has chosen to share, which would otherwise be private, tariff schedules published by utilities or Public Utilities Commissions, notifications of power outages, and other broadcast information from a utility. The terms "public database" and "private database" refer both to the data contained within the database, generically, and the database structures disclosed herein, and their equivalents, not limited to any particular data format. It will be readily apparent to one skilled in the art that various methods of handling, storing and accessing the data and information can be employed with the methods not limited to those described. Databases and tables are only one method among many that could be effectively used in an implementation of the system.

In manual learning phase, the energy monitoring device prompts the user to change the state of one of the devices in the private database. The user then changes the state, and either notifies the energy monitoring device that the state has been changed, or permits the energy monitoring device to detect the change. The load signature is computed and presented to the user for editing and/or acceptance. Alternatively, the user is able to skip the detection of the load signature for a single state of a device, or skip the load signature detection of all states for a device. If the user accepts the load signature data, then the load signature and associated state are stored in a load signature table. The load signature table is able to be maintained inside the energy monitoring device in a memory dedicated for that purpose, or in a general purpose memory. In an automated learning process, the energy monitoring device monitors the power supply for changes in one or more power supply parameters to signal that an electrical device within the home of office has changed state. The energy monitoring device then computes a load signature from the changed data, or takes additional samples as needed, and computes the load signature. The next step is to identify the signature to an appliance by comparing it to a list of devices from the private database and a public database of load signatures. The public database of load signatures includes the signatures of numerous possible appliances and load signatures for the states of the appliances. The public database of load signatures is not limited to the load signatures of a particular home or small business. After the signature has been identified, and a corresponding appliance and state have been identified, the result is presented for the user to edit and accept, or the system times out and accepts the data.

By identifying the load signature and the state for each electrical device, the energy monitoring device is able to provide detailed energy usage for each electrical device that consumes energy in the home or small business. The detailed energy usage information for each electrical device can be displayed on the energy monitoring device, a remote display device such as a smart phone (i.e., an iPhone®, Droid®, Blackberry®), a tablet PC, a PDA, or remote laptop, or on a local personal computer. The detailed energy usage information can be displayed generally through any wired or wireless device. Detailed energy usage information can comprise power consumption, energy, current, power factor, THD, spectral content and other relevant parameters that benefit the user. Energy usage information is able to be tracked by time of day, elapsed time, week, month, and season for comparison. Energy costs can be calculated and displayed showing the current consumption rate in dollars per hour as well as cumulative costs over a period. The energy monitoring device can provide projections of energy consumption by week, month, quarter, season or year based on the history of energy usage tracked by the energy monitor. Detailed energy usage information can further comprise specific information about electrical devices having a standby mode of operation, and information about energy consumption at off hours, such as the night time or when a user is away on vacation. Detailed energy usage information can also comprise advice to the end-user such as how to reduce their monthly electrical bill. This may include adding devices to improve the power factor, replacing old or inefficient appliances, or alternatively, advice on how to correct time-of-day scheduling of energy usage for a more favorable use of a tariff schedule, or suggesting of an alternate tariff schedule. Detailed energy usage information is further able to be used to optimize the settings of various appliances such the temperature setting of a refrigerator. Advice information is further able to comprise notices from a power utility such as urgent warnings from the utility, offers or incentives, notices of tariff schedule changes, or notice that a user's account is due or past due. The energy monitoring device is also able to monitor the quality of the network and notify as to weak power factor, weak total harmonic distortion, under-performance or noisy grid, and ways to improve or correct these inefficiencies.

An energy monitoring device is disclosed which is coupled to a power supply, such as a grid power supply, having an electrical device coupled to the power supply downstream of the energy monitoring device, the electrical device having a plurality of states. In one aspect, an energy monitoring device is programmed to identify the presence of an electrical device coupled to a power supply, and a state of the electrical device, from a change in successive samples of power supply parameters, taken upstream of the electrical device to be monitored. The programmed energy monitoring device comprises at least one of selected and interconnected discrete components, a microprocessor, an application specific integrated circuit (ASIC), a programmed field programmable gate array (FPGA), and one or more configured and interconnected integrated circuits, including analog-digital mixed mode. The energy monitoring device is able to be as small as a single integrated chip set, programmed to interact with a iPhone® or similar consumer electronic device running a user interface application. Power supply parameters are defined as the value of one or more measured parameters of the power supply and the computed parameters which can be derived from the measured parameters. In a preferred embodiment, the power supply parameters include phase voltage, phase current, neutral voltage, neutral current, apparent power, active power, reactive power, energy, elapsed time for energy consumed, the power factor percentage, cos(phi), the total harmonic distortion of the current, voltage, active power, reactive power, an approximation of the total harmonic distortion taking into account a limited number of harmonics (e.g, up to the $15^{th}$ harmonic), spectral content of the current, voltage, active power, reactive power, and fundamental active power, frequency, period, over/under-voltage, conditions, time to establish full power or settling time, in-rush current, sags and number of periods for the events, quality of the network, and other non-electrical data such as time, date, temperature, and humidity. The voltage and current values can be collections of instantaneous sample values, stored as a one-dimensional table, or calculated as an RMS value computed from averaging or integrating a one dimensional table of sample values. RMS values can also be derived from a fixed moving window of "n" points, and therefore be available e.g. every millisecond after an initial set time of, e.g., 1 second. An example table of recorded and/or computed data for a single-phase, 2-wire configuration is shown below:

TABLE I

| Power supply parameter | Example Value(s) |
| --- | --- |
| RMS Phase Voltage [$V_{AC}$] 0-max | 112 |
| RMS Phase Current [$A_{AC}$], 0-max | 4.7 |
| RMS Neutral Voltage [$V_{AC}$], 0-max | 2.4 |
| RMS Neutral Current [degree], 0-360 | 4.6 |
| RMS Apparent Power [VA], 0-max | 645 |
| RMS Active Power [W], 0-max | 527 |
| RMS Reactive Power [$V_{AR}$], 0-max | 167 |
| Energy [J], 0-max consumed in time $T_1$ [sec] | 2340, 7456 |
| Power factor [%], 0-100 | 87 |
| Phase Current THD to, e.g. $25^{th}$ harmonic[%] | 14 |
| Phase Current THD to, e.g. $5^{th}$ harmonic [%] | 12.7 |
| Phase Voltage THD to, e.g. $25^{th}$ harmonic [%] | 2.1 |
| Phase Voltage THD to, e.g. $5^{th}$ harmonic [%] | 1.8 |
| Frequency [Hz], 40-70 | 59.5 |
| Quality of the network [%], 0-100 | 96 |
| Time, Date | (09:37 pm, Dec. 04, 2009) |
| Temperature, C. ° | 28 |
| Humidity [%] | 43 |
| Vector AA = Instantaneous Current [A], n samples | (12.1, 13.5, 14.5, 15.1, 13.8, 11.9, 8.2, 5.6, 2.1, −0.1, −2.8) |
| Vector VV = Instantaneous Voltage [V], n samples | (65, 78, 99, 107, 112, 103, 87, 64, 21, 3, −34) |

A sample is defined as (i) one or more instances of one or more power supply parameters, measured or computed, without regard to a time interval, (ii) one or more instances of one or more power supply parameters, measured or computed, within a fixed time interval, or (iii) RMS values computed from one or more instances of one or more power supply parameters, measured or computed. Detecting a change in successive samples is defined as (i) detecting a change in one or more power supply parameters in a first sample against one or more parameters in a second sample, wherein the sample interval is not a fixed interval, (ii) detecting a change in one or more power supply parameters in a first sample against one or more parameters in a second sample, wherein the sample interval is a fixed interval, (iii) detecting a change in one or more parameters in a first sample against all subsequent samples until a change is detected as against the first sample, (iv) detecting a change in one or more power supply parameters in a first sample against a second sample and, subsequently setting the first sample equal to the second sample before obtaining a next sample; and (v) comparing RMS values of a base sample of one or more power supply parameters against each subsequent sample. Electrical device states can comprise on, off, standby, power down, power up, a percentage of full power, or a named sequence of states. Identification of the presence of an electrical device is accomplished by monitoring the power supply parameters and detecting a change in one or more of the power supply parameters. The load signature corresponding to the electrical device and to the electrical device's state comprises one or more of the power supply parameters as shown in Table I, above. The load signature, an identifier for the electrical device, and a state of the electrical device can be stored in the private database in a memory. In some embodiments, identifying the electrical device and the state can comprise lookup up the load signature in a memory. The memory is able to comprise a plurality of pre-stored signatures. The energy monitoring device can further comprise a communications module, coupled to a remote device via a network, in some embodiments. The energy monitoring device is able to transmit to at least one of the energy monitoring device display module, and a remote device. The communications module is able to both transmit and receive energy monitoring information. Energy monitoring information is able to comprise electrical device information, power usage information, electrical network information, user advice, and power utility information. Examples of electrical device information can comprise an identifier of an electrical device in the plurality of devices, the state of the electrical device, the load signature data of the device for a state of the device, and the power utilization information associated with the device. Examples of power usage information are able to include, but are not limited to, aggregate power consumption information, energy, current, power factor, and total harmonic distortion. Electrical network information is able to comprise weak power factor, weak THD, noisy grid, and circuit performance. User advice is able to comprise information to the user of the availability, or past due date, of a utility bill, advice on how to reduce the bill, usage information categorized by electrical device, predicative usage information based upon past usage patterns, advice on how to improve power factor, when to replace old or inefficient appliances, and detection and advice of planned or unplanned power outage.

In another aspect, a method of identifying an electrical device coupled to a power supply, and a state of the electrical device, comprises receiving a first plurality of power supply parameters, receiving a second plurality of power supply parameters, detecting a change in at least one power supply parameter, as between the first and second plurality of power supply parameters, computing a load signature for the electrical device based upon the first and second plurality of power supply parameters, and looking up the load signature of the electrical device in a memory, wherein the load signatures stored in the memory are associated with an electrical device identifier and a state of the electrical device associated with the load signature, thereby identifying an electrical device coupled to a power supply, and a state of the electrical device. In some embodiments, detecting a change in at least one power supply parameter can comprise detecting a change in the active power, the reactive power, or the apparent power. A method of identifying an electrical device coupled to a power supply, and a state of the electrical device, can further comprise receiving additional power supply parameters, after detecting a change in at least one power supply parameter, and before computing the load signature for the electrical device.

In some embodiments, sampling a plurality of power supply parameters comprises measuring one of phase voltage, phase current, neutral voltage, neutral current, apparent power, cos(phi), period, frequency, active energy, reactive energy, frequency, period, over/under-voltage conditions, temperature, and humidity. The states of an electrical device can comprise off, on, standby, power up, power down, a percentage of full power, and a named sequence of states. In some embodiments, the load signature for the electrical device and the state is able to comprise phase voltage, phase current, neutral voltage, neutral current, apparent power, cos (phi), active energy, reactive energy, apparent power, frequency, period, over/under-voltage conditions, percentage of power factor, RMS current, instantaneous current, RMS voltage, instantaneous voltage, current harmonic THD percentage, voltage harmonic THD percentage, quality of the network percentage, time, date, temperature, and humidity. In some embodiments, the load signature is able to comprise the measured active power, the measured reactive power, the computed apparent power, the computed current based on the nominal voltage of the power supply, and the computed power factor. In some embodiments, energy monitoring information can be transmitted to one or more of a display device and a remote device, including a cell phone such as an iPhone. Energy monitoring information is able to comprise electrical device information, power usage information, electrical network information, user advice, and power utility information. Electrical device information is able to comprise an identifier of an electrical device in the plurality of electrical devices, the state of the electrical device, the load signature data of the device, and the power utilization associated with the device. Power usage information can comprise aggregate power consumption information, energy, current, power factor, and total harmonic distortion (THD). Electrical network information is able to comprise weak power factor, weak THD, noisy grid, and circuit performance. In some embodiments, user advice is able to comprise informing the user of a current daily, weekly, or monthly bill, how to reduce the bill, predictive information regarding future power usage based upon patterns of usage, bill information by categorized by electrical device, how to improve power factor, when to replace old or inefficient appliances, what time of day to schedule device usage to lower the bill, detection and advice as to utility power interruption. In some embodiments, power utility information comprises a tariff change notice, a planned power outage, an imminent power cut-off, a bill due, a suggestion as to how to reduce power bill costs, an incentive offer, a power bill, and an estimated forecast power bill.

In still another aspect, a method of creating a database of load signatures for a plurality of electrical devices having a plurality of states, comprises selecting an electrical device in a first state, measuring a first plurality of power supply parameters, changing the state of the selected electrical device to a second state, measuring a second plurality of power supply parameters, computing a load signature, and storing a database record comprising the load signature, the second state, and an identifier for the selected device, thereby creating a database of load signatures for a plurality of electrical devices having a plurality of states. A first state is able to be OFF and a second state is able to be ON. A method of creating a database of load signatures is further able to comprise looking up the load signature in a database to determine a nearest matching electrical device and state, after computing the load signature, presenting the nearest matching electrical device and state to a user for confirmation of the electrical device and state, and accepting user changes to at least one of the electrical device and state in a database record further comprising the load signature, if the user changes the electrical device or state.

BRIEF DESCRIPTION OF THE DRAWINGS

FIG. 1E illustrates a diagram of the internal components of an energy monitoring device coupled to a power supply, and installed inside of a circuit breaker box according to some embodiments.

FIG. 1F illustrates a diagram of the internal components of an energy monitoring device coupled to a power supply, and installed inside of a circuit break box according to some embodiments.

FIG. 2 illustrates a diagram of the internal components of a remote energy monitoring device, including a thermostat module, according to some embodiments.

FIG. 4 illustrates a diagram of a public power usage database according to some embodiments.

FIG. 5 illustrates a diagram of a public load signature database according to some embodiments.

DETAILED DESCRIPTION OF THE DRAWINGS

A preferred embodiment of an energy monitoring device comprises an energy meter coupled to a power supply system wherein the energy meter makes successive samples of power supply parameters. The power supply parameters are further able to be processed by a controller with a memory. The measurements are able to be used to display current energy usage information and to compute a load signature for a state of an electrical device coupled to the power supply 190, wherein the electrical device has one or more states. At a minimum, a monitored electrical device will have a number of states including an ON state, during which the electrical device will have be an electrical load, and most often will also have an OFF state in which the electrical device will not act as a load or the load will be reduced. Other intermediate states are possible, including a STANDBY state, where an electrical device can visually appear to be OFF, but the electrical device is consuming some amount of power to maintain its STANDBY state. In STANDBY, an electrical device typically can achieve the ON state faster than if the device were powered up from the OFF state.

An energy monitoring device can further comprise a controller or processor, a memory, and a communications module. The controller or microprocessor is able to obtain successive power supply measurements from the energy meter and transmit the power supply measurements to a remote device for processing. Processing of power supply measurements can include storing the measurements, typically with a date/time stamp, computing a load signature for a state of an electrical device coupled to the power supply based on a change in the successive power supply measurements, displaying power usage information including kilowatt-hours used, power usage trends over time, and cost information. The energy monitoring device is able to further comprise, e.g., a USB interface coupled to the communications module. The USB interface is able to be coupled to a personal computer, e.g., for downloading software upgrades to the energy monitoring device, or other data exchange.

Energy Monitoring Device

Figure 1A:
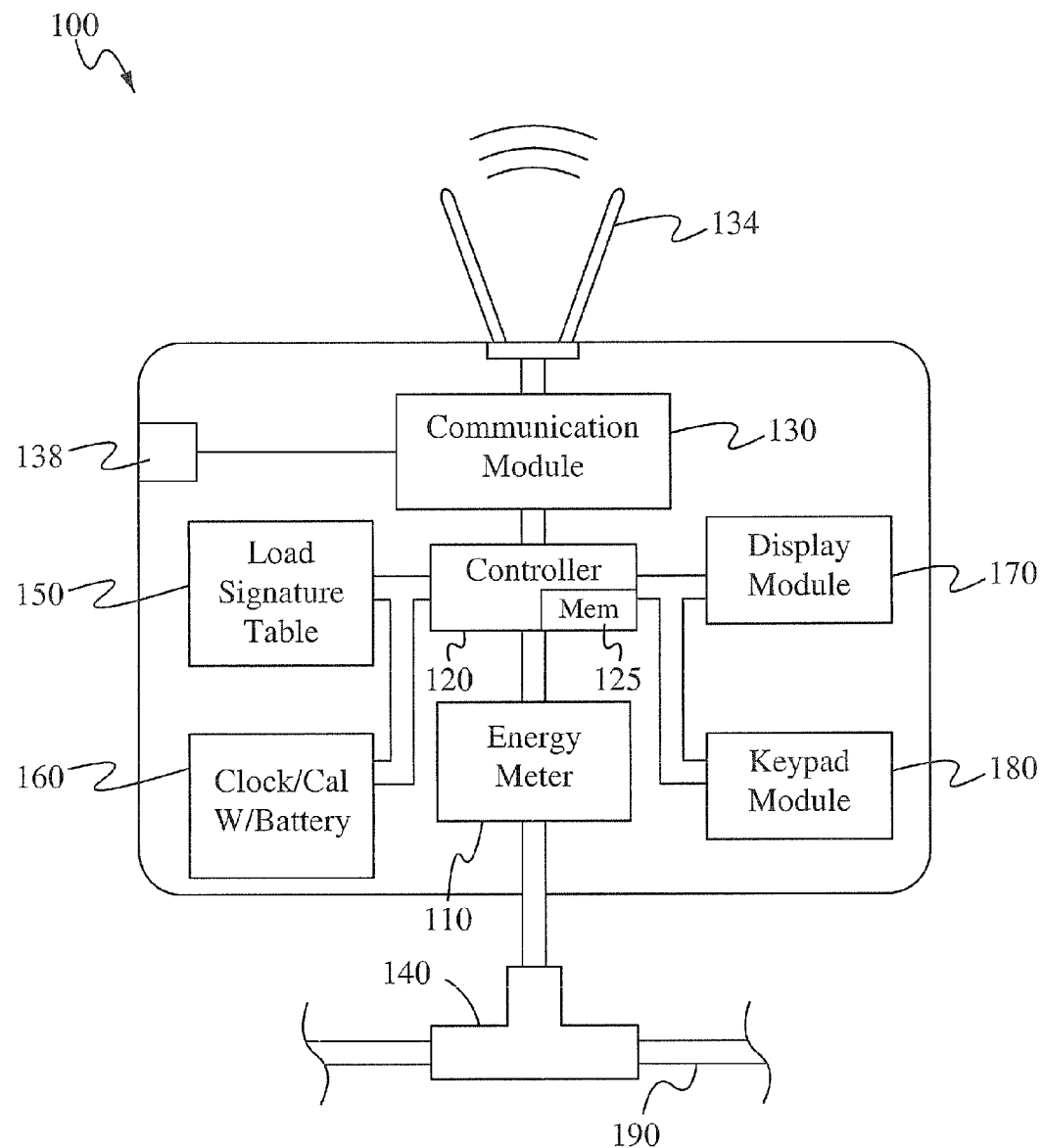
FIG. 1A illustrates a diagram of the internal components of an energy monitoring device coupled to a power supply according to some embodiments.

FIG. 1A illustrates an energy monitoring device 100 coupled to a power supply 190 via a power supply connection 140, which is able to be grid power supplied by a utility, through a meter, to a mains box, and into a home or small business. The power supply is able to comprise any of a wide variety of known power supply types such as 110V single phase, 110V three phase, 440V three phase, 220V three phase, 380V three phase, et al. The power supply 190 is further able to comprise DC voltage sources such as a self-powered structure with a solar panel, DC generator, or other non-grid power supply. The energy monitoring device 100 comprises an energy meter 110, a controller 120 with a memory 125, a communications module 130, a memory for a load signature table 150, a clock/calendar with a battery backup 160, a display module 170, an input module 180, a wireless antenna 134, and a USB port 138. One skilled in the art of embedded systems design would recognize that the controller 120, memory 125, load signature table 150, communications module 130, and energy meter 110 could be implemented as a single system on a chip, the system on a chip having dedicated modules and resources for these functions, or having memory and programming to perform these functions. The energy meter 110 makes successive measurements of the power supply 190. Such measurements can include one or more of phase voltage, phase current, neutral voltage, neutral current, apparent power, cos(phi), active energy, reactive energy, frequency, period, over/under-voltage conditions, quality of the network percentage, time, date, temperature, and humidity. The controller 120 further includes a memory 125 programmed with instructions for computing a load signature from successive power supply measurements. The controller can be a programmed device which is able to comprise at least one of: selected and interconnected discrete components, a microprocessor, an application specific integrated circuit (ASIC), a programmed field programmable gate array (FPGA), and one or more configured and interconnected integrated circuits. The clock/calendar module 160 is coupled to the controller 120 such that the controller is able to date/time stamp the energy meter measurements. A display module 170 comprising a display and a display interface is coupled to the controller 120 such that power supply usage information is able to be displayed on the display 170. An input module 180 can comprise a plurality of keypads and a keypad interface such that the controller 120 is able to perform different functionality in response to a user's inputs. The display module 170 and the input module 180 are able to comprise a touch screen module 175 (not shown). A default display mode for the display is able to comprise display of the power being used, or a graph trend line of power usage over a specified period of time. A person of skill in the art of embedded system design would recognize that any of the data measured, computed, or analyzed by the energy monitoring device is able to be displayed on the display module 170. The controller 120 is further coupled to a communications module 130. The communications module 130 is able to communicate using one or more protocols including RS-232 serial communication, RS-485 serial communication, IEEE 802.11 wireless, IEEE 802.15 wireless, Zigbee wireless, Bluetooth wireless, USB, IEEE 802.3x, IEEE-1394, IEEE 802.15.4, I$^2$C serial communication, IrDA or other communications protocol. The communications are further able to comprise secure (encrypted) transmission protocols to maintain privacy. As shown in FIG. 1A, the communications module 130 is coupled to a USB port 138 and a wireless antenna 134 in some embodiments. The memory 125 and the load signature table 150 are both able to be read or written to via the communications interface. For example, the USB port 138 can be used to upgrade the software stored in memory 125. Energy meter information and load signature information are able to be communicated to remote device(s) via the wireless antenna 134. The controller 120 is further able to be programmed to compute and store load signatures in the load signature table memory 150. The controller 120 is also able to retrieve load signatures from the load signature table 150. The load signature table memory 150 is able to further comprise memory for storing private databases, described further below, configuration information, and other uses.

Figure 1B:
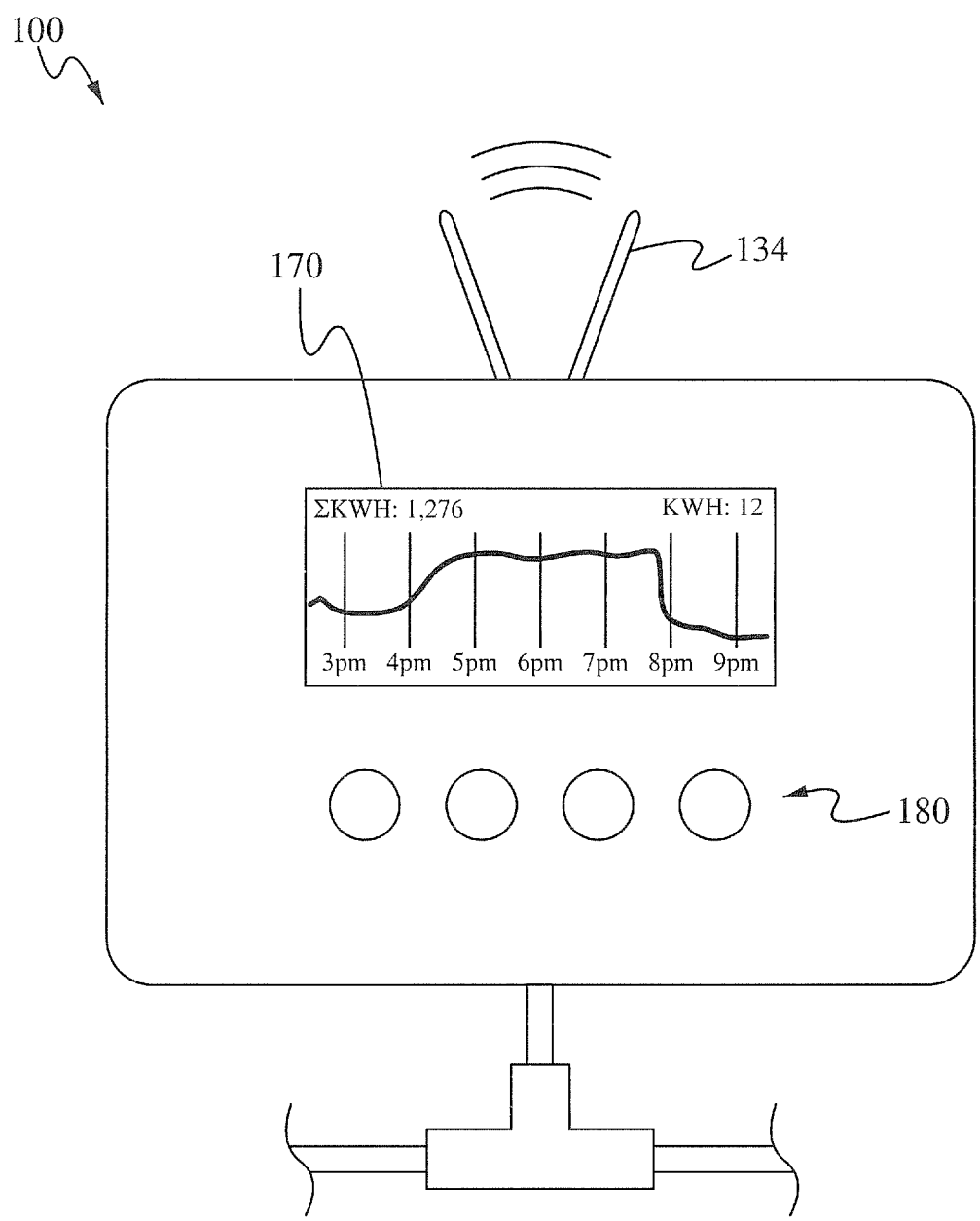
FIG. 1B illustrates a diagram of an external view of an energy monitoring device coupled to a power supply according to some embodiments.

FIG. 1B illustrates an energy monitoring device coupled to a power supply according to some embodiments. In FIG. 1B, a power usage trend line is shown on the display 170, with total kilowatt-hours ("Σ KWH") of power used and the current kilowatt-hours ("KWH") used, displayed over an hourly trend line. In some embodiments, the energy monitoring device is able to display power consumption, energy, current, power factor, THD, and spectral content by time, time of the day, week, month, and season. Energy monitoring information is able to be transmitted to a remote device via communications module 130 and, for example, a wireless antenna 134. Utilizing the input module 180, alternate views of energy usage information (not shown) can be displayed, such as energy usage for a specific device, energy usage per room or per floor, energy usage per circuit, energy usage per type of appliance, mixed display where for instance energy usage is mixed with logos of appliances turned on and/or colors are providing information, a list of connected devices and their current state, a list of devices in a specific state and their energy usage information. The keypads are also able to be used to select configuration screens and enter energy monitoring device configuration information.

Figure 3:
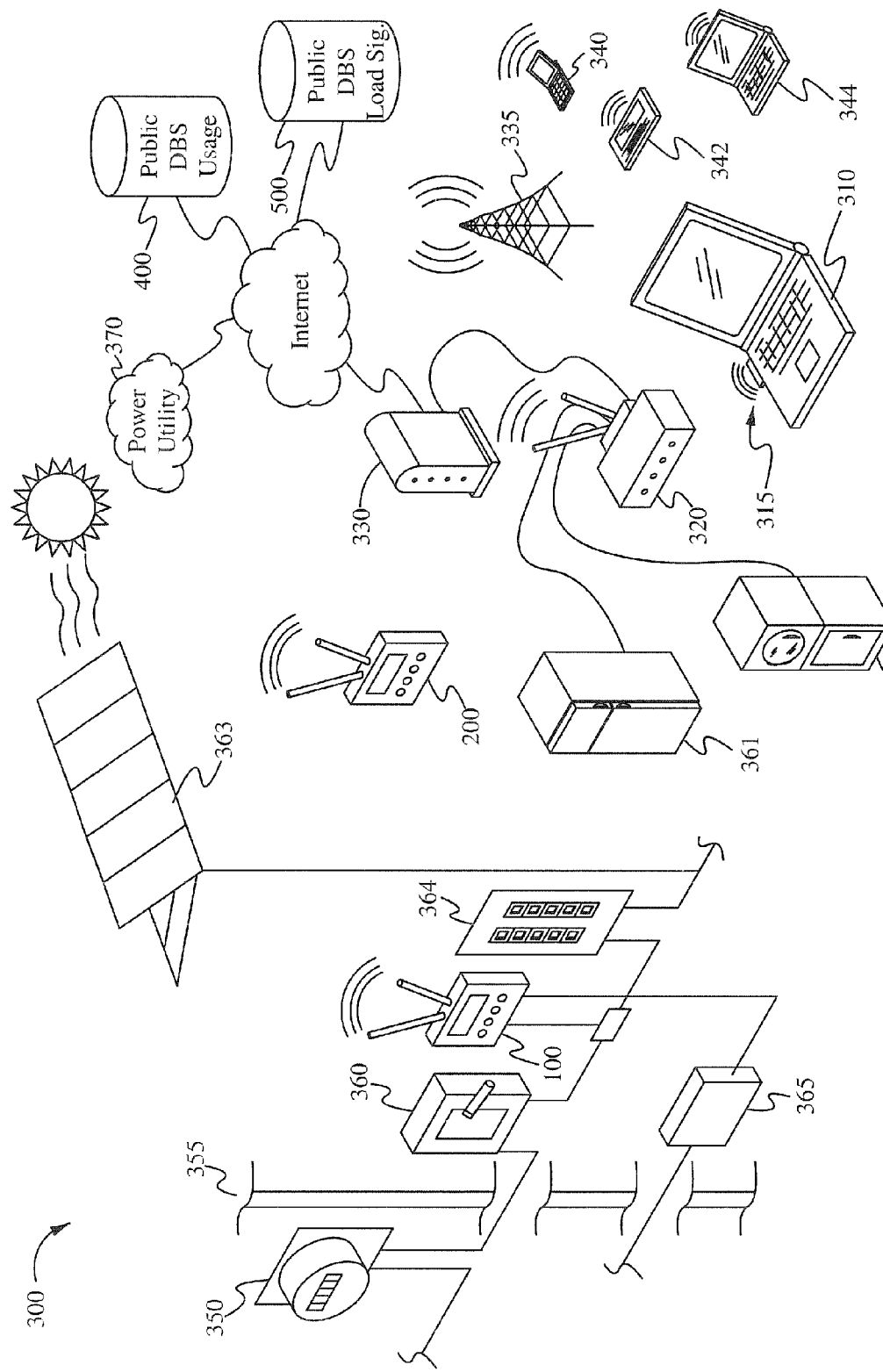
FIG. 3 illustrates a diagram of a communications network of energy monitoring devices and related equipment according to some embodiments.

Although both FIGS. 1A and 1B have been shown comprising a wireless interface 134 and a USB port 138, one skilled in the art will recognize that communication between the energy monitoring device and a remote device can be by any appropriate wired or wireless communication protocol such as RS232 serial communication, RS-485 serial communication, IrDA, Ethernet, IEEE-1394 (Firewire), X10 or other power line carriers, IEEE 802.11 wireless, IEEE 802.15 wireless, Zigbee wireless, Bluetooth wireless, or other communications protocol. The communications are further able to comprise secure (encrypted) transmission protocols to maintain privacy. One skilled in the art will also recognize that the clock/calendar module 160, the load signature table 150, the display module 170, and the keypad module 180 can be located in any appropriate remote device. Appropriate remote devices include, but are not limited to, the remote device disclosed in FIG. 2, an iPhone® 200, a personal computer 310, a personal digital assistant 342, a pocket PC (not shown), a mobile computer 344 as shown in FIG. 3 or other device comprising a time keeping function, memory, and a user interface comprising a display and an input device.

Figure 1C:
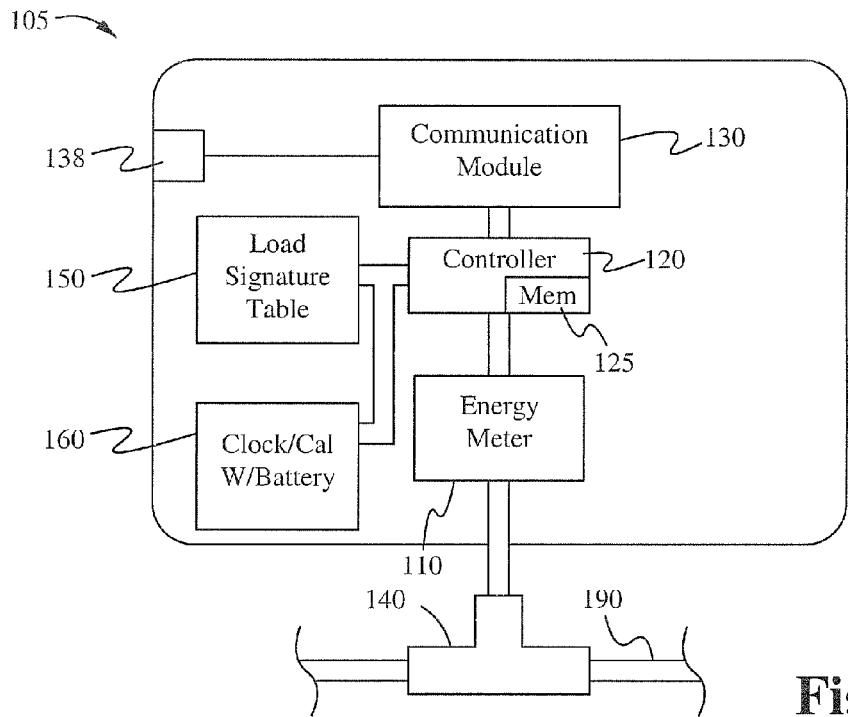
FIG. 1C illustrates a diagram of the internal components of an embedded energy monitoring device coupled to a power supply inside of an Energy Aware Appliance according to some embodiments.

FIG. 1C illustrates a diagram of the internal components of an embedded energy monitoring device 105 coupled to a power supply inside of an Energy Aware Appliance according to some embodiments. The internal components are able to be quite similar to the internal components of the energy monitoring device 100. A controller 120 is coupled to a memory 125 programmed with instructions implementing the embedded energy monitoring device functionality. The controller 120 is further coupled to a communication module 130. The communications module 130 is coupled to, for example, an Ethernet port 132 (not shown). The Ethernet port 132 is able to be coupled to a home network via a router to enable communication with the energy monitor device 100. The USB or Ethernet port is able to be coupled to a personal computer for the purpose of upgrading the software programmed in the memory 125 and exchanging information with the Energy Aware Appliance.

Figure 1D:
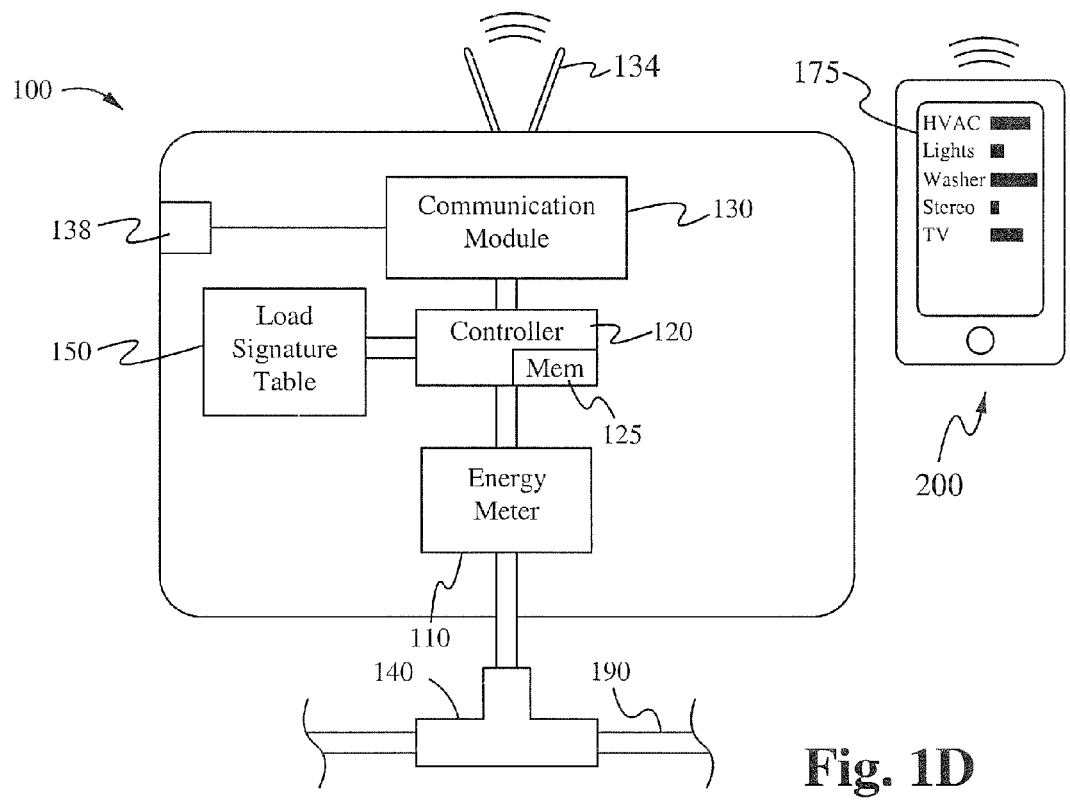
FIG. 1D illustrates a diagram of the internal components of an energy monitoring device coupled to a power supply, and an external interface device, according to some embodiments.

FIG. 1D illustrates a diagram of the internal components of an energy monitoring device coupled to a power supply, and an external interface device, according to some embodiments. A low cost, highly compact version of the energy monitoring device 100 is as able to comprise an energy meter 110, a controller 120 with a memory 125, a communications module 130, a memory for a load signature table 150, a wireless antenna 134, a USB port 138, and Ethernet port 132 (not shown). The highly compact version of the energy monitoring device is able to communicate directly with remote devices such as an iPhone 200 (shown), a laptop computer (not shown), a PDA or other remote display device such as the remote display device 200 shown in FIG. 2. The iPhone 200 (shown) comprises a touch screen 175, as described in FIG. 1A, above. The controller 120 further includes a memory 125 programmed with instructions for computing a load signature from successive power supply measurements. The controller can be a programmed device which is able to comprise at least one of selected and interconnected discrete components, microprocessor, a system on a chip, an application specific integrated circuit (ASIC), a programmed field programmable gate array (FPGA), and one or more configured and interconnected integrated circuits. The controller 120 is further coupled to a communications module 130. The communications module 130 is able to communicate using one or more protocols including RS-232 serial communication, RS-485 serial communication, IEEE 802.11 wireless, IEEE 802.15 wireless, Zigbee wireless, Bluetooth wireless, USB, IEEE 802.3x, IEEE-1394, I²C serial communication, IrDA or other communications protocol. The communications are further able to comprise secure (encrypted) transmission protocols to maintain privacy. As shown in FIG. 1A, the communications module 130 is coupled to a USB port 138 and a wireless antenna 134 in some embodiments. The memory 125 and the load signature table 150 are both able to be read or written to via the communications interface. For example, the USB port 138 can be used to upgrade the software stored in memory 125. Energy meter information and load signature information are able to be communicated to remote device(s) via the wireless antenna 134. The controller 120 is further able to be programmed to compute and store load signatures in the load signature table memory 150. The controller 120 is also able to retrieve load signatures from the load signature table 150. The load signature table memory 150 is able to further comprise memory for storing the public and private databases, described further below, configuration information, and other uses.

FIGS. 1E and 1F illustrate diagrams of the internal components of an energy monitoring device 100 coupled to a power supply 190 and installed inside of a circuit breaker box (FIG. 3, element 364), upstream of all electrical devices to be monitored, according to some embodiments. In this ultra-compact embodiment, the entire energy monitoring device 100 is installed inside the form factor of a circuit breaker housing for installation or inclusion in a circuit breaker box or panel, with the exception of the wireless antenna 134, which is mounted outside of the circuit breaker box to facilitate wireless communication as shown in FIG. 1F. For example, in the case of monitoring a 220V network supplied with 110 V phase, neutral and 110V counter-phase, the 220V circuit breaker form factor provides access to all necessary power mains for monitoring the network while achieving a compact form factor compatible with existing circuit breaker panels and allowing for ease of installation. The internal components are substantially similar to FIG. 1A. The energy monitoring device 100 is coupled to the power supply 190 via a power supply connection 140 as is known in the art of circuit breaker design. Screw terminals 197 are used to couple the circuit breaker type housing 195 to the power supply 190, and thereby to the power supply connection 140. The screw terminals are accessed through access holes 196 in the circuit break type housing 195. The energy meter 110 is coupled to the power connection 140 and is communicatively coupled to the controller 120 with memory 125. The controller 120 is communicatively coupled to the load signature table 150 and to the communications module 130. The energy meter 110, controller 120 with memory 125, the load signature table 150 and the communications module 130 are all able to be mounted on a single printed circuit board 105. The communications module 130 is shown coupled to a wireless antenna 134. One skilled in the art would appreciate that the communications interface need not be wireless. Any suitable communications medium will work including USB, Ethernet, RS232 serial communication, RS485 serial communications or I²C serial communications. Like the compact energy monitoring device shown in FIG. 1D, embodiments according to FIGS. 1E and 1F can communication with a remote device such as an iPhone (not shown) or other smart phone, a tablet PC, a laptop computer (not shown) or a remote display device such as is shown in FIG. 2, above. An LED 107 can be added to indicate that the energy monitoring device is functioning properly.

FIG. 2 illustrates a diagram of a remote energy monitoring display device 200 including a thermostat according to some embodiments. The internal components are able to be quite similar to internal components of the energy monitoring device 100. A controller 120 is coupled to a memory 125 programmed with instructions implementing the remote energy monitoring display device functionality. The controller 120 is able to be coupled to a thermostat 123 with corresponding terminal strip interface 124 in order to communicate with a heater, air conditioner, or combination unit. The controller 120 is further coupled to a communication module 130. The communications module 130 is coupled to, for example, a USB port 138 and a wireless antenna 134. The USB port 138 is able to be coupled to a personal computer for the purpose of upgrading the software programmed onto the memory 125. The wireless antenna 134 is able to receive the energy monitoring information from the energy monitoring device 100 and process and display the energy usage information. The controller 120 is also coupled to a display module 170 and an input module 180. The display module 170, input module 180, and thermostat module 123 cooperate via programming of the controller 120 to operate a connected heater, air conditioner, or combination unit. Energy monitoring information is able to be received via the communication module 130 and displayed on the display module 170. The display module 170 and the input module 180 are able to comprise a touchscreen 175 (not shown). Configuration of the remote device 200 is able to be accomplished by the user via the input module 180. Alternatively, configuration is able to be performed via the communications port, for example, the USB port 138. Configuration, as discussed below, can include selecting a default display mode for the remote device. Power for the remote device 200 is able to be supplied to the remote device by either the thermostat wiring through the terminal strip interface 124 or via a DC input 210 and an AC/DC adapter 220.

FIG. 3 illustrates a typical installation configuration for a home or small business. A power utility meter 350 is located outside a building wall 355 and coupled to the grid at a mains junction box 360 for the building. The energy monitoring device 100 is able to be installed near, just downstream of, the mains junction box 360, and upstream of the circuit breaker box 364. In some embodiments, such as described in FIGS. 1E and 1F, the energy monitoring device is able to be installed inside the circuit breaker box 364, upstream of all circuit breakers. The typical installation is further able to comprise coupling the communications module 130 on the energy monitoring device 100, in this case an 802.3x Ethernet connection 132, to an Internet interface 365 or to a network router 320, a DSL or cable modem 330, and then to the Internet interface 365. A power utility 370 can receive energy monitoring information from the energy monitoring device 100. In some embodiments, the power utility 370 is able to receive the energy monitoring information from a remote device 200, or a computer 310 acting as a remote device. Further, the power utility 370 is able to transmit messages to the energy monitoring device 100. Such messages can be processed by the energy monitoring device 100, or passed on to a remote device 200 which is communicatively coupled to the energy monitoring device 100 via the communications module 130. Messages can also be transmitted to alternate, or supplemental, remote devices including, but not limited to, a personal computer 310 with a wireless interface 315, or mobile remote devices such as a cell phone 340, a personal digital assistance 342, or a mobile laptop computer 344. The energy monitoring device 100 is able to communicate with remote mobile devices 340, 342 and 344 either via an Internet interface 365 or via a network router 320, a DSL or cable modem 330, over the Internet, to a cellular tower 335, then to the remote mobile devices. One skilled in the art would recognize that the mobile devices 340, 342, and 344, the remote device 200, and the computer 310 are also able to send query messages to the utility 370, the public usage database 400, the public load signature database 500, and the energy monitoring device 100. The energy monitoring device 100 is similarly able to furnish energy usage information to the power utility 370. Energy monitoring information is also able to be furnished to a public data base of usage data 400. The power utility 370 is able to furnish information to the energy monitoring device 100, which in turn is able to forward the information from the utility to any of the above remote devices. The energy monitoring device 100 is further able to access the public usage database 400 and a public database of load signatures 500. Energy Aware Appliances, such as a refrigerator 361 and a washer/dryer 362, can contain an embedded energy monitoring device 105 in each Energy Aware Appliance, which is coupled to the router 320 or otherwise communicatively coupled to the energy monitoring device 100. Energy Aware Appliances are discussed in detail, below. Energy generating DC devices, such as a solar panel 363, a generator (not shown) or a wind generator (not shown) can be electrically coupled to the power supply wherein the energy monitoring device is able to measure the power generated and fed back to the utility grid.

FIG. 4 illustrates a sample public usage database. Each energy monitoring device is able to have a unique IP address, a public utility meter serial number, or other unique identifier 410 which identifies the source of the energy meter data while still maintaining a user's anonymity. User billing information, physical residence information, rate date, or a zip code 420 can be used to identify the neighborhood and house where the energy meter information originates, and can be linked to the energy monitoring device. A user can configure their energy meter to publish data to a public usage database 400 as a business, a residence, an industrial user, or other user type identifier 430. A user may choose to publish the square footage 440 of their building where the energy meter is installed. The public database may further have usage types 450, device types, or other breakdown to facilitate query. An energy monitoring device is able to publish incremental or aggregate energy usage information 460. The collection of energy monitoring information published to the public usage database by energy monitoring device users provides a body of data which may be queried and collated to provide usage information to individual users, municipalities, and power utilities.

FIG. 5 illustrates a sample public load signature database 500. A public load signature database record is able to comprise a manufacturer 510 of an electrical device, a model 520, a description 530, and one or more associated states 540. For each state of an electrical device, a default load signature 560 is able to be provided, accessible to energy meters as a default load signature for an electrical device and state detected by the energy meter. Default load signatures are able to be furnished by the manufacturers of electrical devices, independent testing laboratories, or published to the public database by energy monitoring device users. In addition, or alternatively, generic load signatures suitable for a typical house or small business can also be loaded, or pre-loaded, into the energy monitoring device. Loading and pre-loading are able to be performed via the communications port 138, shown in FIG. 1A.

Figure 6:
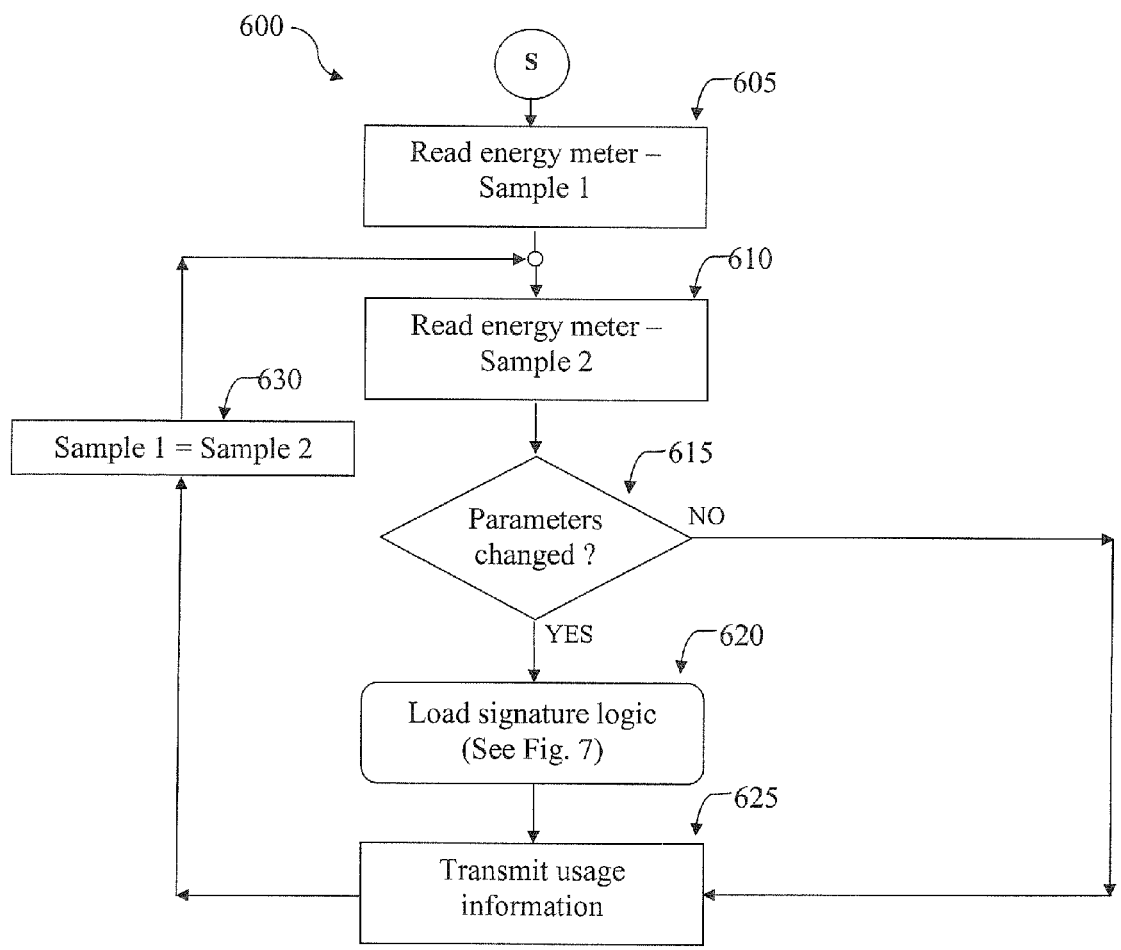
FIG. 6 illustrates a flow diagram of an energy meter operating according to some embodiments.

FIG. 6 illustrates a flow diagram of an energy meter operating according to some embodiments. At step 605, the energy meter measures a first sample of the power supply. Additional power supply parameters are able to be computed from the energy meter sample. Together, the energy meter first sample and the computed power supply parameters comprise first power supply parameters. At step 610, an analogous set of second power supply parameters is measured and computed. A determination is made at step 615 as to whether one or more power supply parameters have changed. If no power supply parameters have changed at step 615, then at step 625 current energy usage information is transmitted either to the display module in the energy monitoring device, or to a remote device within the building, or a combination of these. Optionally, at step 625, current energy usage information is able to be transmitted to the power utility and/or a public database. Then the first power supply sample is set to the second power supply sample at step 630, and a new second set of energy meter measurements is read and additional parameters are computed, comprising a new second power supply parameters list at step 610. If one or more power supply parameters have changed at step 615, then the load signature logic of FIG. 7 is invoiced at step 620.

Figure 7:
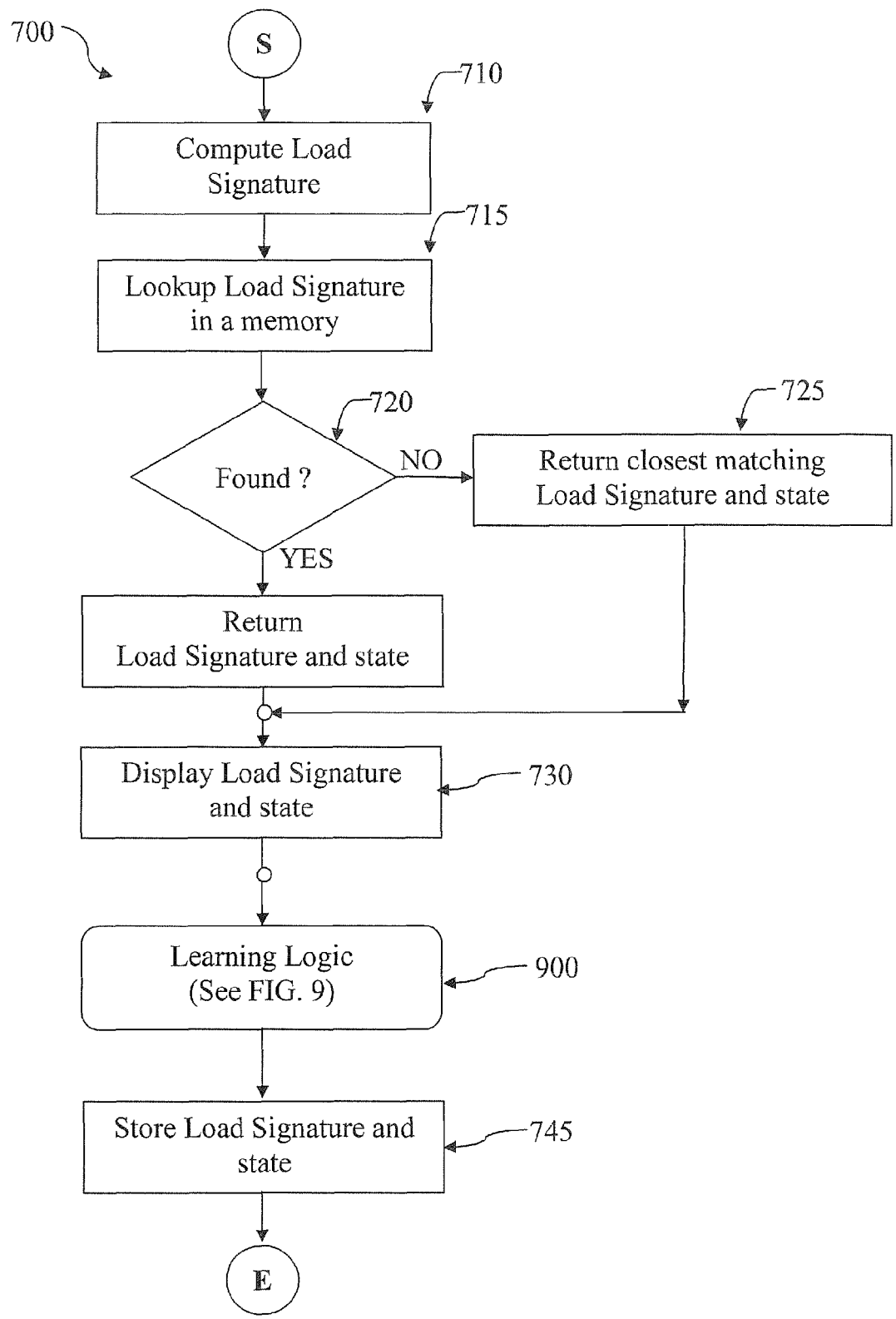
FIG. 7 illustrates a flow diagram of a method of automatically creating a load signature database according to some embodiments.
Figure 8:
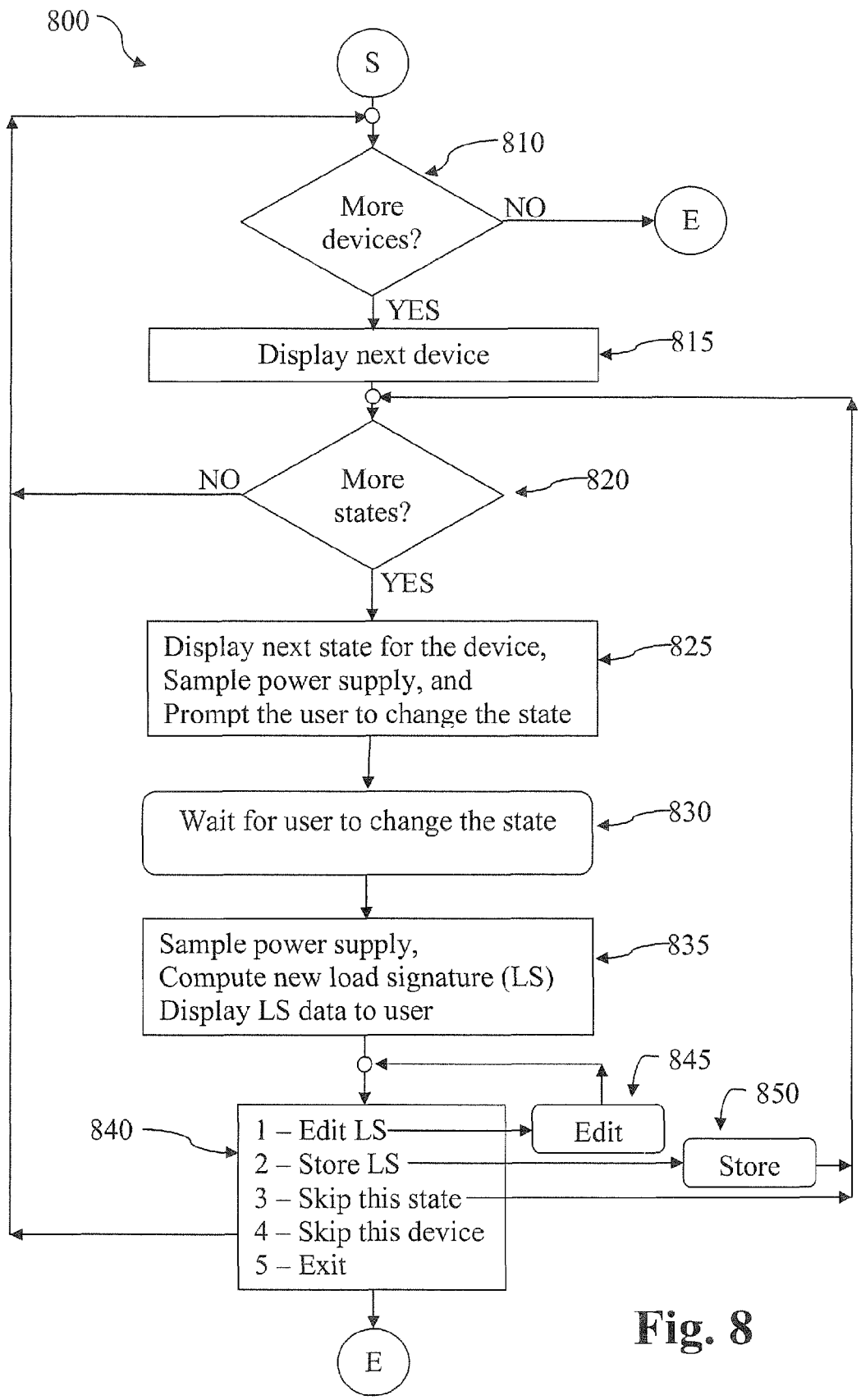
FIG. 8 illustrates a flow diagram of a method of manually creating a load signature database according to some embodiments.

FIG. 7 illustrates a flow diagram of a method of automatic learning for creating a load signature database according to some embodiments. As described at step 740, below, the user can interact with energy monitoring device in this learning mode, to aid the learning. However, if the user does not participate in the automatic learning process, the automatic learning process simply times out where user input is allowed and performs default actions automatically. First, a new computed load signature is calculated at step 710. At step 715, the computed load signature is looked up in a memory. If the load signature is found, the load signature and its corresponding state are returned. If, at step 720, the load signature is not found then the closest matching load signature and state is returned at step 725. At step 730, the load signature found, or the nearest match returned from step 725, and the associated state, are displayed on the user display. The user is permitted to make changes at step 740. FIG. 8 describes the user's interaction in "learning mode." If the user accepts, or a timer expires, at step 735 then the load signature and state are stored in a record in the private database at step 745. Then the method ends and returns to Step 625 of FIG. 6. As described above, at step 625 of FIG. 6, energy usage information is then transmitted to the display module on the energy monitoring device, or a remote device within the building, or a combination of these. Optionally, at step 625, current energy usage information may be transmitted to the power utility and/or a public database.

FIG. 8 illustrates a diagram of the steps for manual learning of load signatures and states for one or more electrical devices. As described in Private Databases, below, the user is able to store records in the private database which identifies one or more electrical devices installed in his home or small business office. For each electrical device, he is further able to store records for one more states for each electrical device in private databases. The private database is then able to be downloaded to the energy monitoring device using well-known communication methods. The private database, downloaded to the energy monitoring device, is then able to be used to step the user through the manual learning process as described in FIG. 8. In a preferred embodiment, the user interface to the learning process is implemented as an application on an iPhone® or other portable device with wireless communications, a display screen and input module, such as a touch screen. At step 810, if the energy monitoring device has not yet learned all of the electrical devices, then the next device to be learned is displayed on the user's display device, else the process ends. At step 820, if there are more states to be learned for the displayed device, then at step 825 the next state to be learned is displayed to the user, the power supply is sampled, and the user is prompted to change the state of the electrical device to the displayed state. For example, if the device is a lamp with a 60 W incandescent bulb, the user is prompted to turn the lamp to the ON state. The process waits at step 830 for the user to change the state. The wait process can be terminated by the user continuing that he has changed the state, by the energy monitoring device monitoring the power supply to see that the apparent power has increased by approximately 60 W, or other means such as manual termination of the process by the user or time-out. At step 835, the power supply is sampled and a new load signature is computed and displayed for the user. At step 840, the user has plurality of options which can comprise selecting and editing mode 845 for the load signature, selecting a storing option 850 to store the load signature, skipping the state and looping back to step 820 to check for more states for this electrical device, skipping the electrical device and looping back to step 810 to check for more electrical devices, or exiting the learning process. One skilled in the art will in possession of this disclosure would recognize that steps can be added or deleted, or the order changed, within the scope of the disclosure.

Figure 9A:
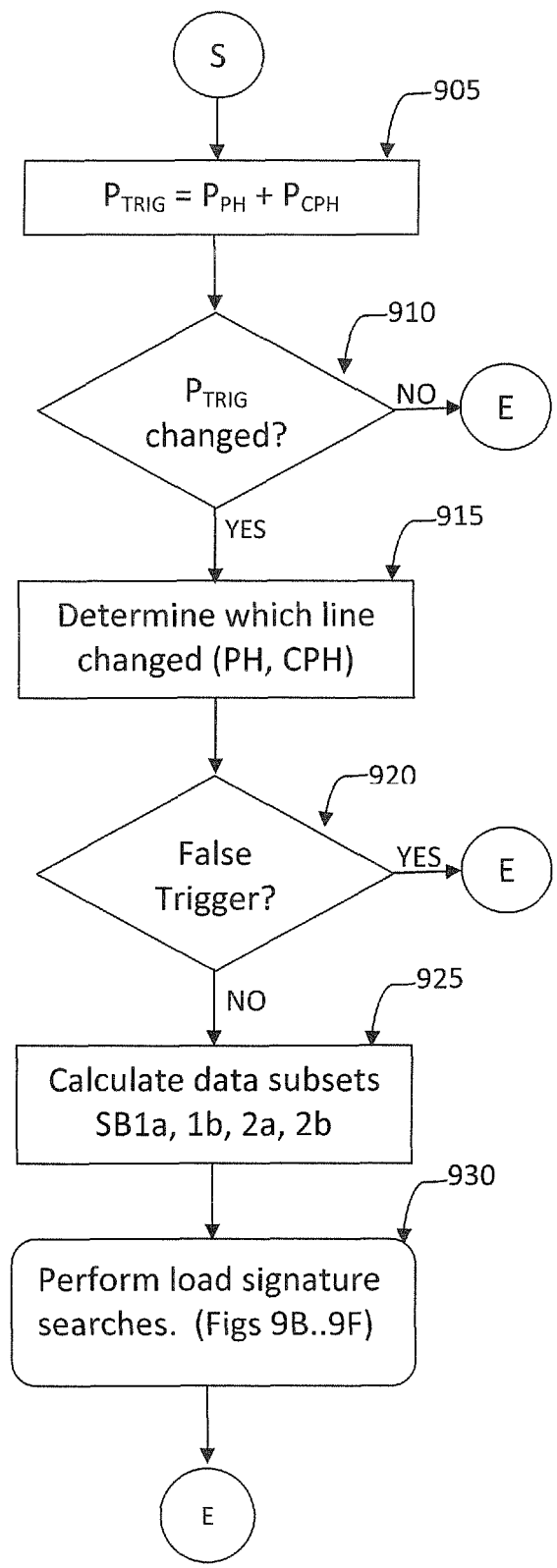
FIG. 9A illustrates a flow diagram of a portion of a method of identifying a device and state from a load signature according to some embodiments.

FIG. 9A illustrates a flow diagram of a portion of a method of identifying a device and state from a load signature according to some embodiments. At step 905, $P_{TRIG}$ is calculated to determine whether a load signature needs to be calculated. If $P_{TRIG}$ has changed at step 910, then it is determined which wire (phase, counter phase) experienced the change. If there is no change in $P_{TRIG}$ at step 910, then the method is ended. A false trigger is checked for at step 920. If there is a false trigger, then the method is ended. If there is no false trigger, then at step 925 data subsets SB1$a$, 1$b$, 2$a$ and 2$b$ are calculated as described below in Load Algorithms. At step 930, load signature search algorithms are invoked, as described below.

Figure 9B:
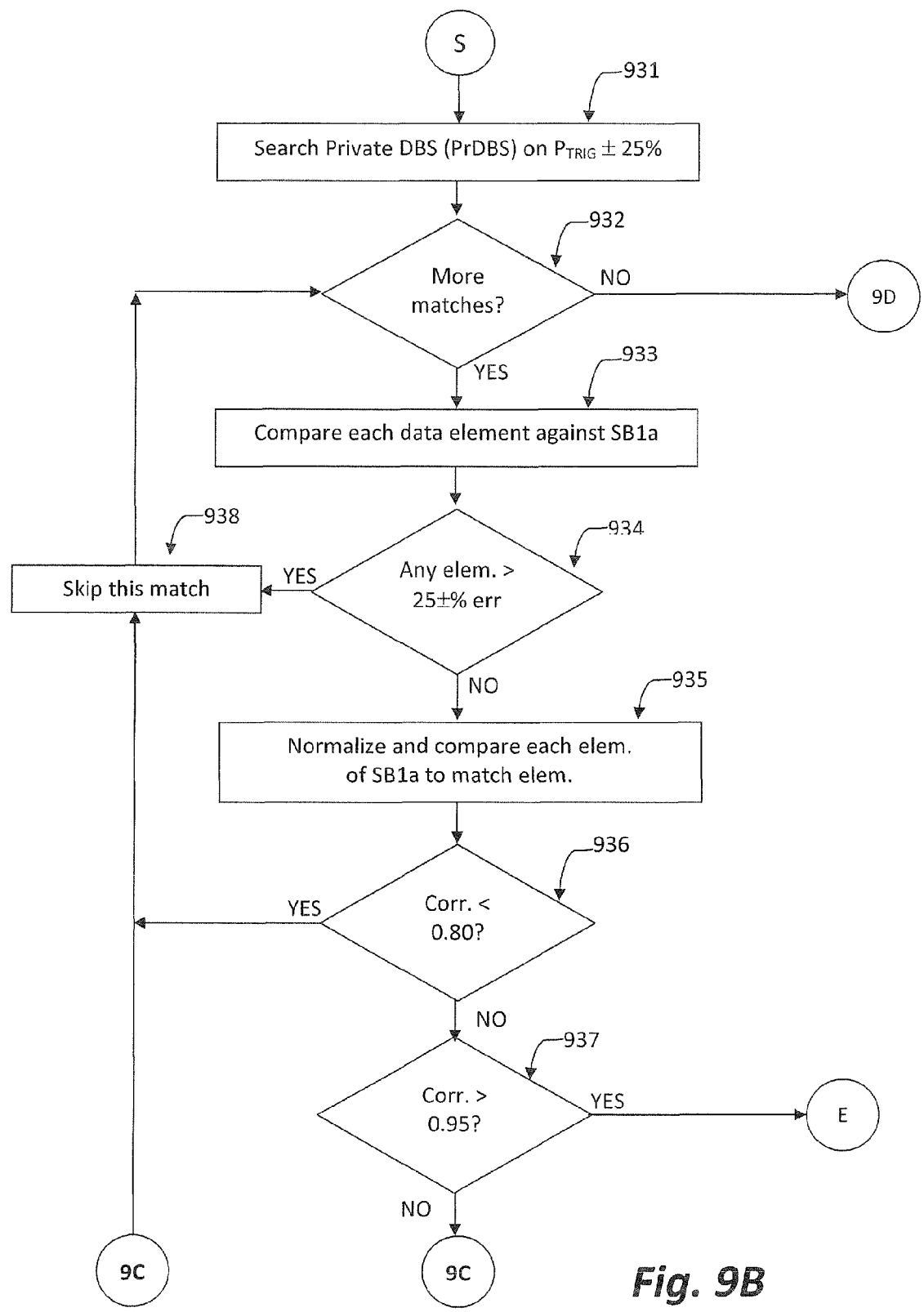
FIG. 9B illustrates a flow diagram of a portion of a method of identifying a device and state from a load signature according to some embodiments.

FIG. 9B illustrates a flow diagram of a portion of a method of identifying a device and state from a load signature according to some embodiments. At step 931, the private database of load signatures in the energy monitoring device is searched on $P_{TRIG}$, for a coarse match such as ±25%. If there are no more matches at step 932, then the method exits to FIG. 9D for further analysis. At step 933, for a match to the search of step 931, each data element in SB1$a$ of the load signature being looked up is compared against each data element of the match. At 934, if any element is has greater than 25% error, then the match is skipped at step 938, otherwise the data are normalized at step 935 and compared again, element by element. At step 936, if the correlation is less than 0.80 then the match is skipped. If the correlation is greater than 0.95 at step 937, then a match has been found to the load signature and the method ends. Otherwise a second level analysis is performed at FIG. 9C.

Figure 9C:
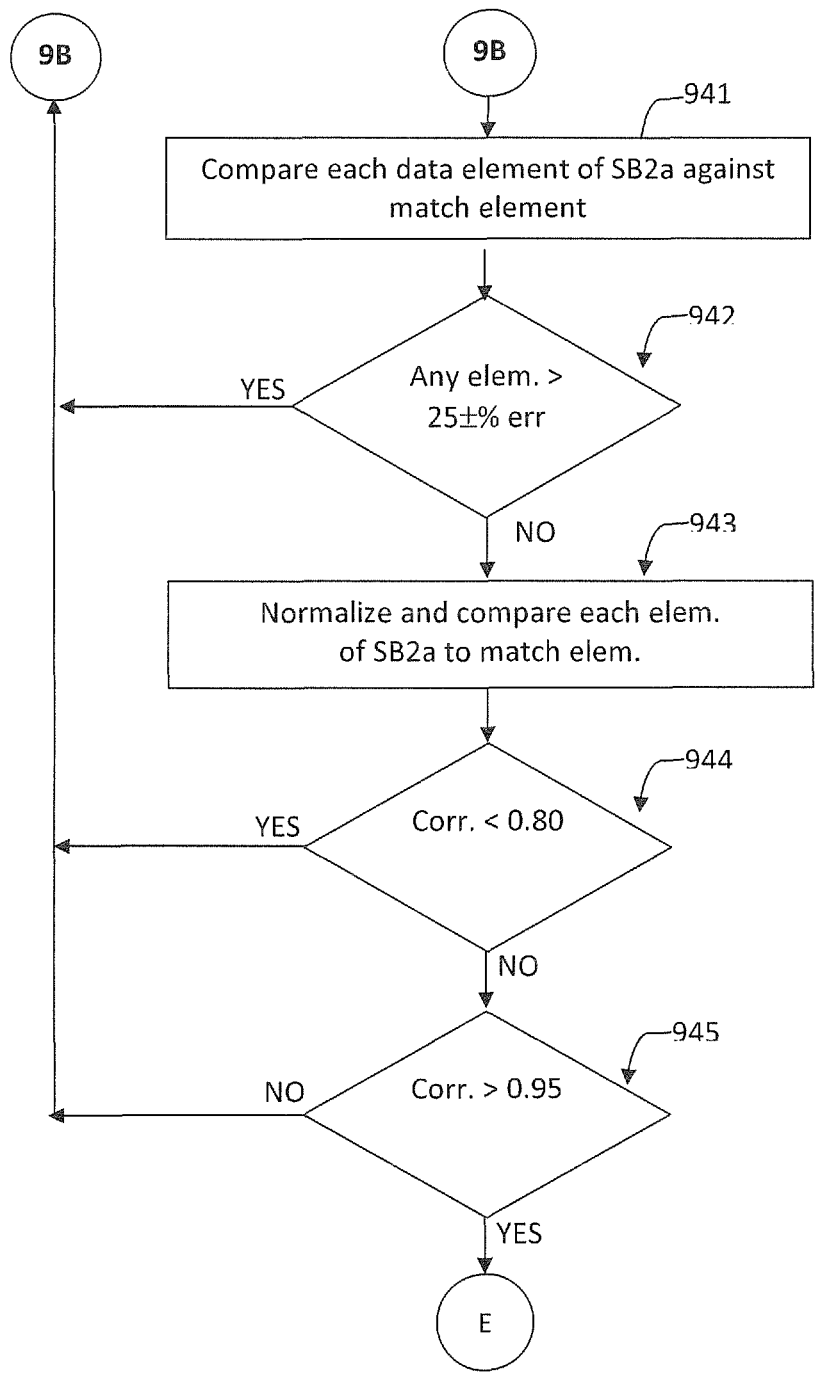
FIG. 9C illustrates a flow diagram of a portion of a method of identifying a device and state from a load signature according to some embodiments.

FIG. 9C illustrates a flow diagram of a portion of a method of identifying a device and state from a load signature according to some embodiments. At step 941, each element of data subset SB2$a$ is compared against its corresponding element in the match. If any element has greater than 25% error, then the match is skipped and the method returns to FIG. 9B. Otherwise, the data are normalized and compared element by element similar to step 941. If the correlation at step 944 is less than 0.80, then the method returns to FIG. 9B. If the correlation is greater than 0.95 at step 945 then the load signature has been found and the method ends, otherwise the method returns to FIG. 9B.

Figure 9D:
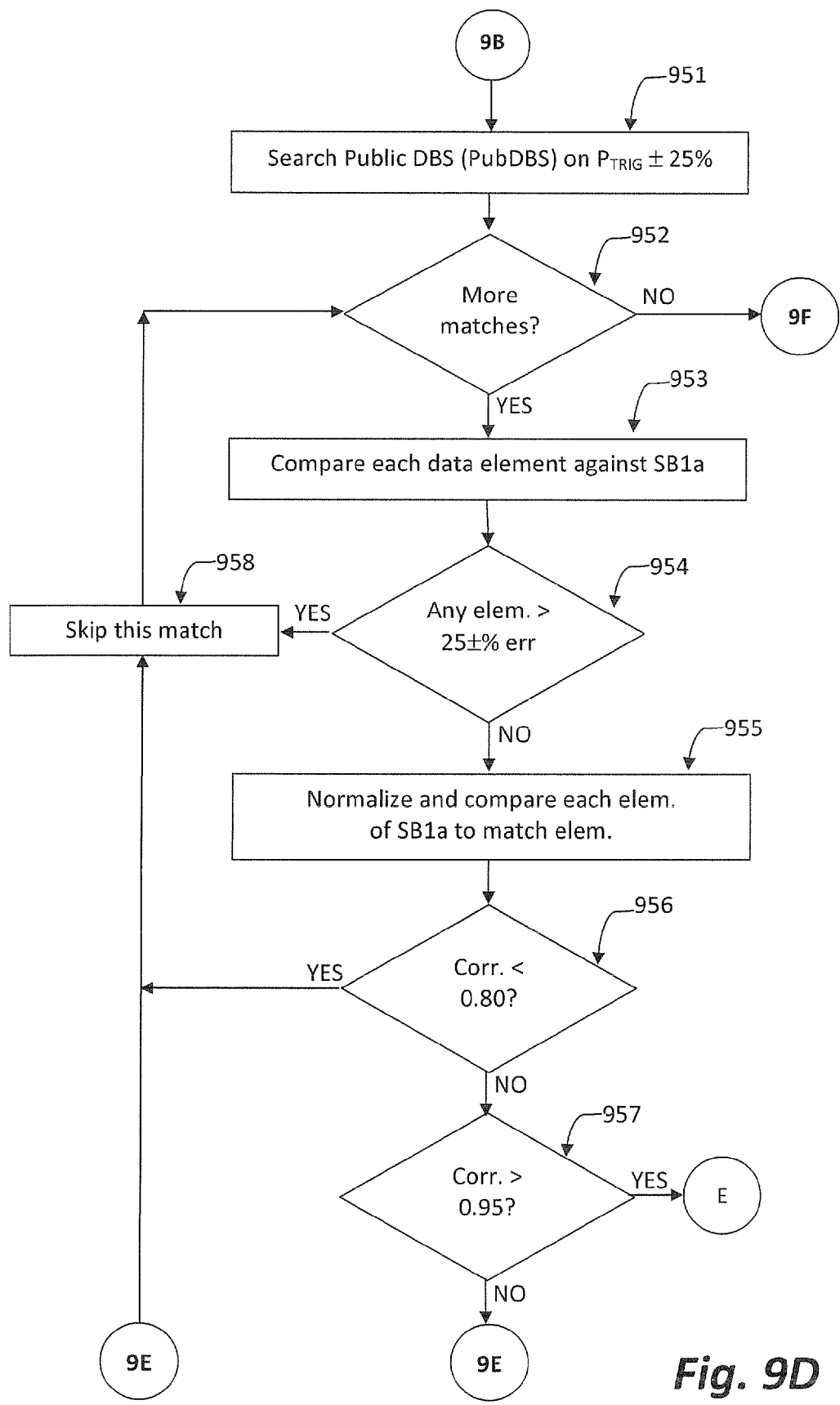
FIG. 9D illustrates a flow diagram of a portion of a method of identifying a device and state from a load signature according to some embodiments.

FIG. 9D illustrates a flow diagram of a portion of a method of identifying a device and state from a load signature according to some embodiments. If the search of the private database does not yield a matching load signature, then the public database is searched at step 951 on $P_{TRIG}$ with a coarse search of ±25%. If there are no more matches at step 952, then the method exits to FIG. 9F for further analysis. At step 953, for a each match to the search of step 951, each data element in SB1$a$ of the load signature being looked up is compared against each data element of the match. At 954, if any element is has greater than 25% error, then the match is skipped at step 958, otherwise the data are normalized at step 955 and compared again, element by element. At step 956, if the correlation is less than 0.80 then the match is skipped. If the correlation is greater than 0.95 at step 957, then a match has been found to the load signature and the method ends. Otherwise a second level analysis is performed at FIG. 9E.

Figure 9E:
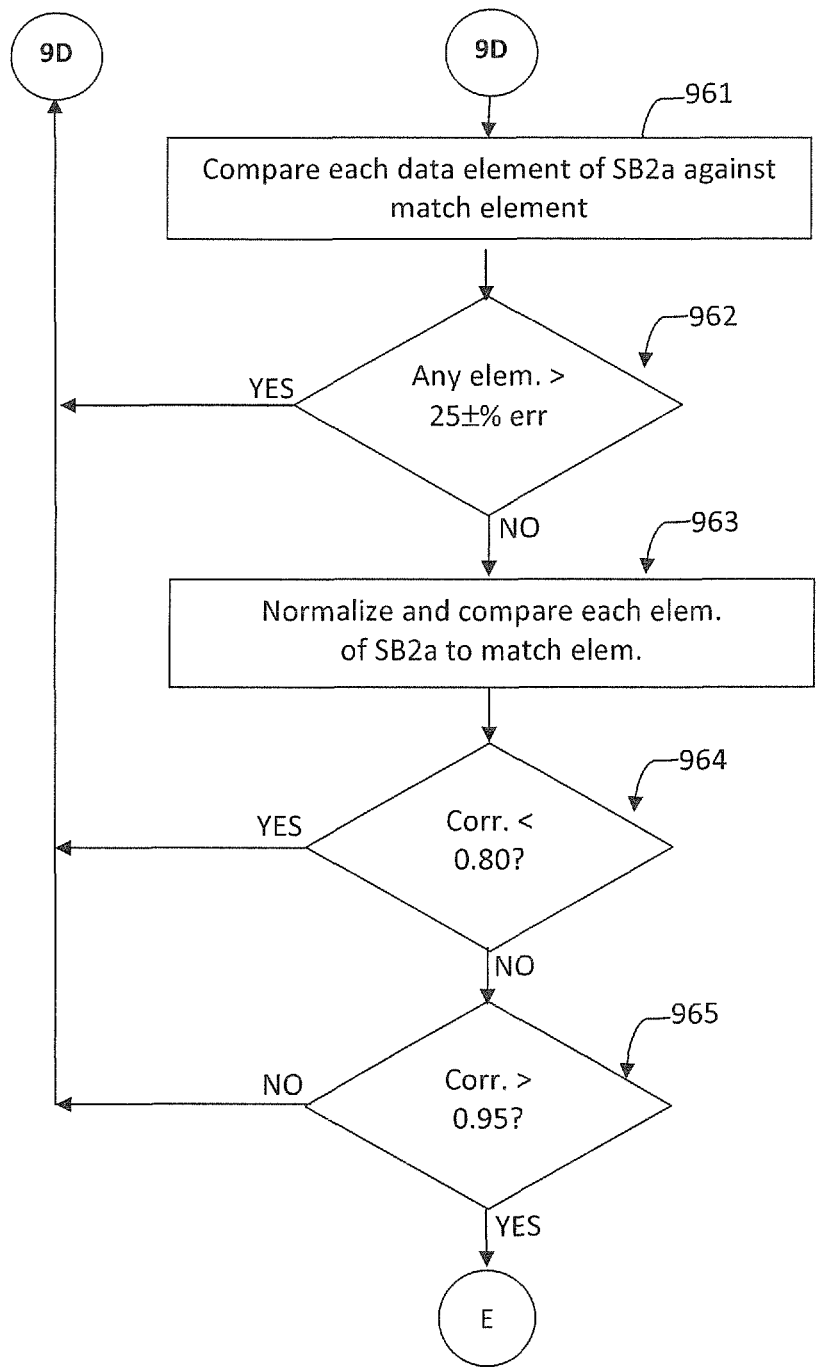
FIG. 9E illustrates a flow diagram of a portion of a method of identifying a device and state from a load signature according to some embodiments.

FIG. 9E illustrates a flow diagram of a portion of a method of identifying a device and state from a load signature according to some embodiments. At step 961, each element of data subset SB2a is compared against its corresponding element in the match. If any element has greater than 25% error, then the match is skipped and the method returns to FIG. 9D. Otherwise, the data are normalized and compared element by element similar to step 961. If the correlation at step 964 is less than 0.80, then the method returns to FIG. 9D. If the correlation is greater than 0.95 at step 965 then the load signature has been found and the method ends, otherwise the method returns to FIG. 9D.

Figure 9F:
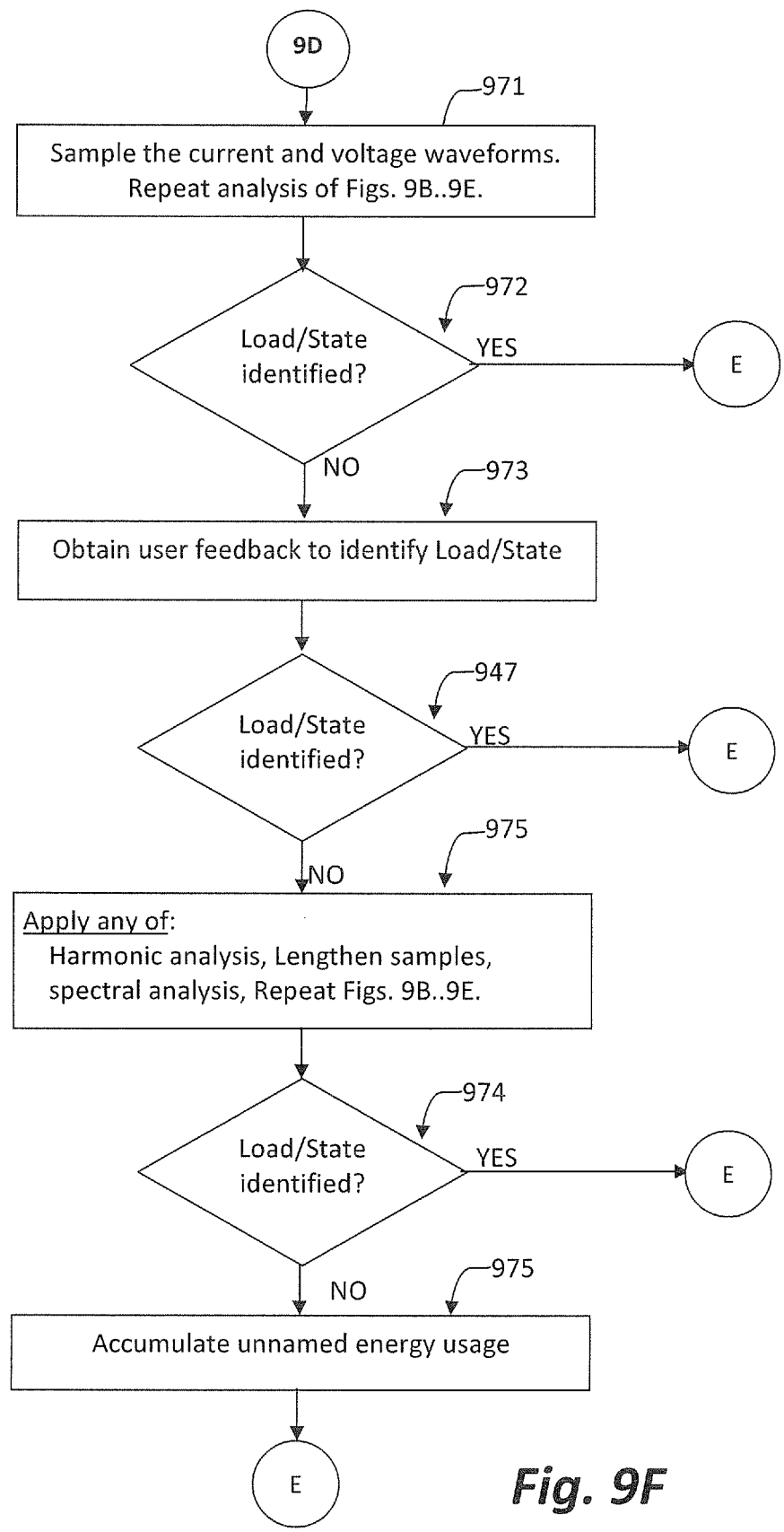
FIG. 9F illustrates a flow diagram of a portion of a method of identifying a device and state from a load signature according to some embodiments.

FIG. 9F illustrates a flow diagram of a portion of a method of identifying a device and state from a load signature according to some embodiments. At step 971, the current and voltage waveforms are sampled. The steps in FIGS. 9B through 9E are repeated. If the load signature is identified at step 972, then the method ends. Otherwise the user is prompted for feedback to assist in identifying the load and state. If the user identifies the load and state then the method ends, otherwise additional analysis is performed, including but not limited to harmonic analysis, lengthening the samples, spectral analysis, and re-running the analysis of FIGS. 9B through 9E. If the load signature still cannot be identified, then the energy usage is accumulated and reported as "unidentified energy usage.

Public Databases

Public Usage Database

The energy monitoring device 100 is able to generate detailed usage information about the electrical devices connected to a customer's power supply and the customer's energy usage. Such detailed information can readily be received and collated by a public database server which is able to be hosted by a widely accessible public database service such as Google®, MSN® or Yahoo®. A public usage database comprises a storage of database records comprising a unique identifier for the energy monitoring device producing the using information, geographic or locality information such as a neighborhood, zip code or street in a city and state, a type of structure, such as home, small business, or industrial, an approximate square footage of the structure in which energy using devices are located and an identifier for the class of a device, such as electronics, appliances, lighting, etc, or an identifier of a specific device. Query tools can be used to access the database records, as described in FIG. 4. At a minimum, the query tools enable an energy monitoring device to lookup a load signature and an associated state for an electrical device. Other parties interested in hosting information can comprise manufacturers hosting load signature databases of their products, testing laboratories hosting databases of load signatures, and energy-saving enthusiasts. Information stored in the public usage database can be as detailed as the configuration of the energy monitoring device 100 is capable of producing, and as limited as the user is willing to share, as controlled by the customer's configuration of the energy monitoring device. Detailed information can include the manufacturer, model, and purchase date of a specific electrical device, the time and date which a specific device changes state, the room in which a device is installed, the user typically using the device, the total energy usage and time duration in specific state, the cost of the usage, and the tariff schedule used. Detailed information can further comprise generic appliance information, e.g., a ¼ HP electric drill (no manufacturer), a 12,000 BTU air conditioner, or a 40 W incandescent light bulb. Generic device information is able to be uploaded from users, or computed or estimated from analysis of one or more similar devices. Customer demographic information can also be stored such as the zip code and street on which a customer lives or works, the number of people in the household or business, and the square footage of the household or business. The public usage database is able to aggregate the detailed information and provide query tools to inform customers as to the usage patterns of other energy users. The public usage database can further comprise a forum for suggestions by users as to how they reduced their energy consumption such that similarly situated energy users are informed of known options for reducing energy usage. One skilled in the art will recognize that a wide variety of energy user profile information can be added to the detailed usage information to enable broad public awareness of energy usage patterns, thereby enabling a wide spectrum of energy-saving tools. The availability of detailed energy usage information provided by the energy monitoring device 100 and its associated private databases, enables the implementation of the public usage database.

Public Electrical Device Database

A record in a public database of electrical devices is able to comprise an identifier for the electrical device, the manufacturer, model, nominal device voltage, maximum rated amperage, and a list of states of operation of the electrical device. As individual users utilize their energy monitoring systems, the users are able to export their private databases of electrical devices to populate the public electrical device database. In addition, the public database of electrical devices is able to be populated through database administration methods such as manually entering device data, or receiving device data via upload from manufacturers.

Public Electrical Device States Database

Records in a public database of electrical devices states are able to comprise a device identifier, a state identifier, a state description, and a load signature for the state. As individual users utilize their energy monitoring systems, the users are able to export their private databases of device states to populate the public electrical device states database. In addition, the public database of electrical device states is able to be populated through database administration methods such as independent testing laboratories providing device state load signatures to the public database, or manufacturers uploading states and/or load signatures for their electrical devices.

Public Load Signature Database

Records in a public database of load signatures are able to comprise electrical device identifier information, as described for the public electrical device database above. The public database of load signatures is further able to comprise generic devices and types. For each state of each device type, a load signature, as described below under Load Signature Algorithms, is able to be stored. Additional information related to a load signature is able to be stored with the load signature for an electrical device and a state, as described in FIG. 5.

Private Database

An energy monitoring device is coupled to a power supply upstream of one or more electrical devices whose energy usage is to be monitored. The electrical devices, and their associated states are stored in a private database accessible to the energy monitoring device. At a minimum, the private database further comprises the load signatures associated with the electrical devices coupled to the power supply, and their states. The energy monitoring device uses the private load signatures database to identify an electrical device, and its state, so that usage information for the device can be reported. For example, a load signature associated with a "Lamp 1" changing state to "ON" is stored in the private load signature database accessible to the energy monitoring device. When a load signature is calculated from successive power supply measurements, the load signature is compared against the private load signature database to identify the electrical device and state associated with the load signature. The private database is able to be created using software tools on the energy monitoring device or on an alternate computing device such as a personal computer. If the private database is created on a device other than the energy monitoring device, then the private load signature database is able to be downloaded to the energy monitoring device via a communications connection such as Ethernet, or a USB port on the energy monitoring device.

In order that the energy monitoring information presented to the user be more meaningful, or actionable, additional tables or lists of information can be populated. Such tables or lists can also facilitate building the load signature database for the connected electrical devices and their states. For example, the private database can comprise a list of rooms in a building, electrical devices in the building, energy users in the building, an associations of users with rooms, and associations of electrical devices with rooms. To facilitate set-up of the energy monitoring device, these data items and relationships can be created on any convenient computing device and downloaded to the energy monitoring device via the USB port, or other communications method, on the energy monitoring device. Example private databases are described below. One skilled in the art would recognize that database fields may be added or deleted.

Rooms Table

A table or list of rooms for a building enables monitoring energy usage by room and by attributes associated with the room. A table or list of rooms can comprise an identifier for the room, a textual description of the room, the square footage of the room, and the type of room (office, bedroom, den, boardroom, utility closet, garage, kitchen, etc.).

Energy User Table

A table or list of energy users can comprise an identifier for the user, a textual description of the user, demographic information such as age group, gender, occupation, title of position, percentage of time the user occupies a given room, the division for which an employee works, an account for which their usage will be charged back to their division, and other user-related information. It is contemplated that user information is often considered personal and will either not be disclosed or exported at all, or will only be disclosed or exported generically, or will be password protected or otherwise non-disclosed.

Accessible Network Devices Table

The energy monitoring device is able to communicate with Energy Aware Appliances comprising an embedded energy monitor, with connected network equipment such as a router or hub, server, and network clients, remote locations such as a public utility web site, web sites which host public databases, web sites of manufactures of the brand of equipment installed in the user's building, and the user's own remote communication devices such as a cell phone, personal digital assistance (PDA), mobile computer, or other remote communication device. Records in the Private Accessible Network Devices database comprises a unique identifier such as an IP address, web page URL, or other access identifier, a text description of the network device, and a set of permissions for access to the remote sites, and by the remote sites. One skilled in the art will recognize that control of access to remote devices by the energy monitoring device can be accomplished by a wide variety of known techniques. Similarly, access control by remote devices to the energy monitoring device can be accomplished by a wide variety of known techniques.

Electrical Devices Table

A table or list of electrical devices can comprise a device identifier, a textual description, a date purchased, a general category of device (appliance, electronics, lights, etc.) and a specific type of device (stove, microwave, stereo, computer, refrigerator, washer, etc.). The private database can further include a manufacturer and model number of an electrical device, thus enabling the private database to access a public database of electrical devices to retrieve electrical device information, states, and default load signature information for each state of the electrical device.

Misc. Tables, Lists and Associations

The private database is able to comprise tables or lists of electrical devices, states, users, and rooms can be associated together using well-known relational database techniques to enable detailed energy usage information reporting by room, by user, by device, by date/time, by device, by device and state and such other relevant breakdown as is enabled by the private and public databases. For example, a user may obtain energy usage information by room, and observe that a substantial amount of energy is consumed by his 13 year old son's video game console. He may further view energy usage information for the game console based upon state (ON/OFF) and date and time, to also monitor the amount of time of game console usage. A user is able to view the amount of energy consumed by devices in a specific state, such as STANDBY. Many contemporary devices have a standby state which visually appears very similar to the OFF state, but consumes power. A user can query the private databases to find the devices which are in STANDBY mode, and power OFF those devices thereby saving an identifiable amount of energy.

One skilled in the art would recognize that populating the private database, and its associated tables, lists and associations, is most expediently accomplished using a conventional computing device with access to the public databases, then downloading the initialized private database to the energy monitoring device.

Public Utility Interface

The energy monitoring device 100 provides a convenient electronic communications interface between a public utility and an energy user. As a part of a power utility's customer account records, the public utility is able to store the IP address of the customer's energy monitoring device 100, or other identifier such as an email address or web URL of the user's home network, to communicate with the user's home or business communications network, and with the customer's mobile devices such as a cell phone, personal digital assistance, pocket PC, or other mobile computing device. The public utility is able to receive the customer's energy usage information, if the user configures his energy monitoring device 100 accordingly, and the public utility is able to transmit messages to the customer relevant to his account and information relevant to his energy usage. Such information can include new tariff schedules, notices of incentives and offers relevant to energy usage, notifications of the customer's account status such as when a bill is due or overdue, advice to the customer on ways to reduce energy usage such as timed scheduling of the use of certain high usage devices like HVAC units, washers, and dryers. The power utility is further able to inform the user as to how his energy usage compares to that of others in his neighborhood. One skilled in the art would recognize that the above information can be transmitted to the energy user, or queried by the energy user. The communications and information infrastructure enables bi-directional communication between the energy monitoring device 100 and the public utility 170.

Load Signature Algorithms

A load signature, as used within the present-claimed invention, is a plurality of parameters of a power supply, measured or calculated, in response to a change in state of an electrical device coupled to the power supply downstream of the energy monitoring device. The energy monitoring device measures power supply parameters from the power supply and computes additional power supply parameters from the measured parameters. A change in a power supply parameter, such as active power, may indicate a change of state in an electrical device coupled to the power supply.

In a preferred embodiment, a multi-stage approach is used for detecting a load signature for a state of a device in a network of electrical devices. For this embodiment, four subsets of data are used: SB1a, SB1b, SB2a, and SB2b. SB1a includes the parameters most used of the time for carry out a first level load detection. SB1b includes useful parameters of first level but typically not used to detect a load signature. SB2a includes the parameters most used for carry out a second level load detection. SB2b includes useful parameters of second level but not typically used to detect a load signature.

In a preferred implementation of 3-wire single phase configuration (phase, counter phase, neutral), the signature is the four 4 subsets of data of the following parameters.

TABLE II

| Subset SB1a | |
|---|---|
| Data element | Description |
| CFG | Connectivity of the Load (phase to neutral, phase to counter phase, or counter phase to neutral) Value 0, 1 or 2. |
| THD_$P_{PH}$ | Active power THD plus noise of the phase |
| THD_$P_{CPH}$ | Active power THD plus noise of the counter phase |
| THD_$Q_{PH}$ | Reactive power THD plus noise of the phase |
| THD_$Q_{CPH}$ | Reactive power THD plus noise of the counter phase |
| $P_{PH}$ | Active Power of the phase (Fundamental and harmonics up to a maximum sampling bandwidth) |
| $P_{CPH}$ | Active Power of the counter-phase (Fundamental and harmonics up to a maximum sampling bandwidth) |

TABLE II-continued

| Subset SB1a | |
|---|---|
| Data element | Description |
| $Q_{PH}$ | Reactive Power of the phase (Fundamental and harmonics up to a maximum sampling bandwidth) |
| $Q_{CPH}$ | Reactive Power of the counter-phase (Fundamental and harmonics up to a maximum sampling bandwidth) |
| $U_{PH}$ | RMS Voltage of the phase (Fundamental and harmonics up to a maximum sampling bandwidth) |
| $U_{CPH}$ | R RMS Voltage of the counter phase (Fundamental and harmonics up to a maximum sampling bandwidth) |
| Quiescent/ Inrush current | 10-90% establishment time |

TABLE III

| Subset SB1b | |
|---|---|
| Data element | Description |
| L_ST | Load added or removed (1 or 0) |
| LT_LS | Last time load added or removed, YYYYMMDD, HHMMSS |
| SPG | Self power generation in the network of devices (0, 1, or 2). 0 means none, 1 means 1, 2 means several. |
| LT_CH | Last time of change, YYYYMMDD, HHMMSS |
| $PFU_{PH}$ | Fundamental Active power of the phase (harmonics removed) |
| $PFU_{CPH}$ | Fundamental Active power of the counter phase |
| $QF_{PH}$ | Fundamental reactive power of the phase |
| $QF_{CPH}$ | Fundamental Reactive Power of the counter-phase |
| $SF_{PH}$ | , Fundamental Apparent Power of the phase |
| $S_{PH}$ | Apparent Power of the phase |
| $SF_{CPH}$ | Fundamental Apparent Power of the counter phase |
| $S_{CPH}$ | Apparent Power of the counter phase |
| $I_{PH}$ | Current of the phase |
| $I_{CPH}$ | Current of the counter phase |
| $PF_{PH}$ | Power Factor the Phase |
| $PF_{CPH}$ | Power Factor of the Counter-Phase |
| P | Total consumed active power on Phase and Counter-phase |
| Q | Total consumed reactive power on Phase and Counter-phase |
| S | Total consumed apparent power on Phase and Counter-phase |
| I | Total consumed current on Phase and Counter-phase |
| $I_N$ | Current of the Neutral |
| 10% power ratio | Power ratio after 10% of establishment time |
| 30% power ratio | Power ratio after 30% of establishment time |
| 60% power ratio | Power ratio after 60% of establishment time |
| 90% power ratio | Power ratio after 90% of establishment time |
| IOCR | Inrush over-current ratio |
| P_B | Pointer to baseline (old signature, wears & tears). |
| CT_S | Cycle time signature Y/N, value 0 or 1. |
| P_CS | Pointer to Cycle signature (if applicable, else nil). |
| MarkerType | Marker type (time, frequency, else). |
| MarkerTable | Marker table (provides the validity start condition of each sub-signature). |

TABLE IV

| Subset SB2a | |
|---|---|
| Data element | Description |
| $PS_{PH}$ | m points, Active Power Spectrum of the phase (real, imaginary) |
| $PS_{CPH}$ | m points, Active Power Spectrum of the counter phase (real, imaginary) |
| $PS_{PH}$_Subset | s points, subset of the Active Power Spectrum of the phase (real, imaginary) |
| $PS_{CPH}$_Subset | s points, subset of the Active Power Spectrum of the counter-phase (real, imaginary) |
| $QS_{PH}$ | m points, Reactive Power Spectrum of the phase (real, imaginary) |
| $QS_{CPH}$ | m points, Reactive Power Spectrum of the counter phase (real, imaginary) |
| $QS_{PH}$_Subset | s points, Subset of Reactive Power Spectrum of the phase (real, imaginary) |

TABLE IV-continued

Subset SB2a

| Data element | Description |
|---|---|
| $QS_{CPH}$_Subset | s points, Subset of Reactive Power Spectrum of the counter-phase (real, imaginary) |
| $IW_{PH}$ | 2n points, Current Waveform of the phase (real, imaginary) |
| $IW_{CPH}$ | 2n points, Current Waveform of the counter-phase (real, imaginary) |
| $IS_{PH}$_Subset | u points, Subset of Current Spectrum of the phase (real, imaginary) |
| $IS_{CPH}$_Subset | u points, Subset of Current Spectrum of the counter-phase (real, imaginary) |

TABLE V

Subset SB2b

| Data element | Description |
|---|---|
| $Avr\_PS_{PH}$ | r points, t-times averages of Active Power Spectrum of the phase (real, imaginary) |
| $Avr\_PS_{CPH}$ | r points, t-times averages of Active Power Spectrum of the counter phase (real, imaginary) |
| $Avr\_QS_{PH}$ | r points, t-times averages of Reactive Power Spectrum of the phase (real, imaginary) |
| $Avr\_QS_{CPH}$ | r points, t-times averages of Reactive Power Spectrum of the counter phase (real, imaginary) |
| T_LT | Temperature at last time of change |
| T_PR | Present time temperature |
| $IS_{PH}$ | 2n points, Current Spectrum of the phase (real, imaginary) |
| $IS_{CPH}$ | 2n points, Current Spectrum of the counter phase (real, imaginary) |
| $IS_N$ | 2n points, Current Spectrum of the neutral (real, imaginary) |
| $US_{PH}$ | 2n points, Voltage Spectrum of the phase (real, imaginary) |
| $US_{CPH}$ | 2n points, Voltage Spectrum of the counter phase (real, imaginary) |
| $IW_N$ | 2n points, Current Waveform of the neutral (real, imaginary) |
| $UW_{PH}$ | 2n points, Voltage Waveform of the phase (real, imaginary) |
| $UW_{CPH}$ | 2n points, Voltage Waveform of the counter phase (real, imaginary |

Table III, SB1b parameters are primarily computed from Table II, SB1a parameters. Table V, SB2b parameters are primarily calculated from Table IV, SB2a parameters. The public database of load signatures contains known appliances, electrical loads and their associated states. In some embodiments, the load signature for the public database comprises all four Tables II through V. Depending upon the specific load and state, some values are able to be undefined, zero or nil, such as CFG, the electrical connectivity of the load that is typically not known before installation and may vary from property to property. The private load signature database is able to comprise load signatures utilizing the same table elements, except that the actual values are specific to the actual loads detected by the energy monitoring device. In a preferred method of determining the electrical device and state, all four data subsets, Tables II through V, are measured or computed. $P_{TRIG}=P_{PH}+P_{CPH}$ is used to track a change in the network power consumption. The method first attempts to identify the load signature utilizing the private database. If a change is detected, first determines on what wire or wires (phase, counter phase, neutral) that the change occurred upon. For instance a load turned ON on the phase will typically show a change in the phase and the neutral. A load turned ON on the counter phase will typically show a change in counter phase and neutral, and a load turned ON on the phase to counter phase will typically show a change in phase and counter phase but not in neutral. Before doing any calculations, the method verifies that the $P_{TRIG}$ is not a false trigger. For example, the method verifies the length of the power change. If it is shorter than 0.50 seconds, it assumes a false trigger due to noise. The four data subsets, Tables II through V, are then calculated. Next, $P_{TRIG}$ is used to search the private database for possible candidates for a load signature, using a wide tolerance of, such as 25%. For each possible candidate, a wide tolerance check is performed on the Table II data. If at least one Table II data element is outside the 25% tolerance of the candidate load signature, then the candidate is skipped and the next candidate is considered in a like manner. Then, for each candidate, for every parameters of Table II, the corresponding element of the candidate is normalized toward the corresponding element of the load parameter. The normalization provides a ratio close to the value one if the candidate parameter is very close or identical to the load parameter; else if away from the value of one this shows a weak correlation. Thereafter all the normalized parameters are put in a temporary table and the table is auto correlated to average out the correlation amongst all parameters. For each candidate, each Table II data element is compared against the normalized candidate data element. If the peak correlation value of the temporary table is greater than 0.95, then the method assumes with high probability that the load is found and the electrical device and state corresponding to the load is identified. If the peak correlation value of the comparison is less than 0.80, then a second level algorithm is used. The first loop of the second level algorithm uses the same steps as above, except using Table IV data elements instead of Table II data elements. Note that Table IV values can comprise multiple parameters per data element, and not single data values as in Table II. For data elements with multiple values (a vector of values), the load signature is analyzed in two stages. First, for each data element in Table IV, the vector of values in the data element is compared to the corresponding vector of values in the candidate load signature data element by calculating the peak correlation value between the two vectors, and secondly, comparing the single values used to calculate the peak correlation value. If the peak correlation value is lower than 0.80, then the next candidate is evaluated. If no identification is found to none of the possible candidates in the private database, then the load signature to be identified is analyzed using each of the two levels of the above algorithm against the public database of load signatures. If the load signature is identified, then it stores the load computed load signature and the identified electrical device and state in the private database. If the load signature is still not identified, then a third level algorithm is used to identify the load signature. In the third level algorithm, the load signature parameters are recalculated using voltage and current waveform samples. If the recalculated load signature is different, then it performs the two level analysis, above, using the recalculated load signature against the private database. If no match is found, then it performs the two level analysis, above, using the recalculated load signature against the public database. If the recalculated load signature is still not identified, then the method can signal the user to ask for feedback regarding the load and state. Additional analysis can also be performed using signal processing techniques including harmonic analysis using fast Fourier transforms (FFT's), digital filters, correlation, comparison, averaging, spectral analysis and any combination of these. Further, sample times can be lengthened for complex or long duration load signatures such as the start up cycle of a large motor, e.g. driving a pump, fan or compressor. A next level can be added considering that several loads may change their states simultaneously versus the sampling rate. In this scenario, a identification search would use a combination of two or more loads changing their state and use this new table versus the private or public data base.

Additional load signature calculation and identification methods include the following. A simple implementation of the load signature is to measure and compute the active power and the reactive power. From these values, more can be derived such as the power factor percentage, the cos(phi), and other power supply parameters. Assuming the line voltage $V_{NOMINAL}$ is known and equal to, for example, 110VAC in the United States or 220 VAC in most European countries, the apparent RMS current, the active RMS current, and the reactive RMS current can be further calculated from the active power, reactive power, nominal voltage, and power factor.

A second implementation for the load signature is to measure and compute the apparent power, the active power, the reactive power, and the energy over a time period. Again, from these values, more power supply parameters can be derived such as the power factor percentage, cos(phi), and other parameters. Assuming a line voltage of $V_{NOMINAL}$ is known, the apparent RMS current, the active RMS current, and the reactive RMS current can be further calculated with possibly higher accuracy.

A third implementation can add the measurement and computation of the RMS values of the active current, apparent current and reactive current. Additionally, it can add the measurement and computation of the RMS value of the active voltage, apparent voltage and reactive voltage.

Another implementation for the load signature is to measure and compute waveform of the active power. From this table of data, FFT, averaging, filtering and correlation can be calculated to compute and identify load signatures.

Another implementation for the load signature is to measure and compute waveform of the apparent power. From this table of data, FFT, averaging, filtering and correlation can be calculated to compute and identify load signatures.

Another implementation can add the measurement and computation of the THD or an approximation of the THD of the active power taking into account a limited number of harmonics, for example, up to the "$n^{th}$" harmonic, the THD of the fundamental active power without any harmonic content, the frequency, the period, over- or under-voltage conditions, sag, and number of periods for the event(s), the quality of the network, and other non-electrical data such as the time, day, temperature, and humidity.

Yet another embodiment can add measurement and computation of a collection of instantaneous samples such as instantaneous current and/or instantaneous voltage, in-rush current, or settling time. In-rush current does not necessarily equate to the settling time. For instance when an electrical motor starts, the in-rush current may be 15 A peak for 3 seconds, until the motor acquires a speed of 150 rpm. In this example, the settling time may be 7.3 seconds meaning that the motor reaches 90% of the quiescent current after 7.3 seconds. Settling time and in-rush current may be added to the signature such as:

(1) Settling time: $t_s@90\%$ $I_{QUIESCENT}<I_{PEAK}<110\% I_{QUIESCENT}$ (2) In-rush current: $I_{INRUSH\_MAX}@t_1$ and $1<130\% I_{QUIESCENT}@t_2$ In further embodiments, more measurements and computations can be added including the effective number of bits of the voltage, current, active power, or reactive power waveforms, matrix calculations and/or analog digital processing such as FFT, auto-correlation, cross-correlation, digital filtering, windowing, and metric/error minimization. Spectral content is able to be analyzed including the harmonic content up to the $n^{th}$ harmonics of the current waveform, the voltage waveform, the active power waveform, the reactive power waveform, for example. Spectral content can also be analyzed for correlation of the measured spectral content versus a reference spectrum, difference in the spectrum magnitude, the phase, the real and imaginary values for each point in the FFT, the frequency spectrum, and the variation of an aspect of the spectrum with time. The load signature can further comprise a wideband aspect of the spectrum including many harmonics. The load signature is further able to comprise a selective detail of one or a few harmonics, such as the low frequency phase noise of a particular harmonic. For example, two loads may have the same similar power consumption and similar THD but may have different spectral content which is able to be used to discriminate between the two loads.

In another embodiment, the load signature is comprises computation of the active power, the reactive power, the apparent power, the RMS voltage, the current, the power factor, and active power THD.

The above load signature algorithms are able to discriminate between different devices and the different states of each device. The dynamic range to be monitored can be quite large. For example, the system can discriminate between a small electrical load, such as a five watt night light being turned on, and a very large electrical load, such as a washing machine starting its spin cycle for a large load of laundry or an HVAC unit sized for a large building starting up its warming cycle on a Monday after a cold winter weekend. Large devices also frequently have complex operating characteristics comprising numerous states. Modern devices are also frequently controlled by embedded controllers which set their operating states. Therefore, it can be desirable to embed an energy monitoring device into such appliances and to interface the embedded energy monitoring device to the controller of the electrical device such that the electrical device controller can inform the embedded energy monitoring device when it is transitioning to a new state. In some embodiments, the embedded energy monitoring device can be interfaced to the controller of the electrical device such that the embedded energy monitoring device can assert one or more control commands of the electrical device. As an alternative to fully embedding an energy monitoring device in an appliance, the controller in an appliance having communication protocols compatible with the energy monitoring device described herein is to interface to the energy monitoring device and is able to transmit a factory-stored load signature from the appliance to the energy monitoring device for a state of the appliance. In some embodiments, an energy monitoring device interfaced to an appliance controller, as described below, is able to transmit actual load signature information to the appliance to update the factory-stored load signature tables stored in the appliance.

Energy Aware Appliances

As shown in FIG. 1C, above, the energy monitoring device 100 described above can be modified for embedding into an electrical device, thereby creating an Energy Aware Appliance. An embedded energy monitoring device 105 is particularly appropriate for embedding in electrical devices which consume large amounts of energy and/or have complex operational patterns comprising numerous states, each with its own load signature, especially where the device has a high initial cost. The additional incremental cost of adding an embedded energy monitoring device is readily absorbed in the appliance cost and defrayed by the energy savings achieved through effective use of the embedded energy monitoring device. An embedded energy monitoring device is further beneficial where changes over time in the load signature for a state of the device can be used to detect excessive wear in one or more electrical components in the appliance. In such instances, the Energy Aware Appliance is able to notify the user of upcoming maintenance issues in the appliance, or when it is time to replace the appliance. The embedded energy monitoring device is able to comprise a private database with a factory default load signature and a factory test result load signature for each operating state of the Energy Aware Appliance, a list of states in which the Energy Aware Appliance operates, manufacturer and model information, nominal operating voltage, maximum operating current, and an Energy Aware Appliance Protocol for communicating with the energy monitoring device 100. When an energy monitoring device 100 is first powered on, it is able to broadcast a message to any connected energy appliances, querying whether any such devices are present and connected to the communications network. The embedded energy monitoring device 105 monitors the power supply of the device in which it is embedded and creates an actual load signature for each operating state of the Energy Aware Appliance. The embedded energy monitoring device 105 is further able to inform the energy monitoring device 100 that the energy monitoring device 100 does not need to compute the load signature for the current state of the electrical device changing state because the embedded energy monitoring device 105 has already computed it. For each state, the embedded energy monitor 105 can compare the computed load signature against the factory default, or a load signature computed by a testing laboratory, to determine the electrical operating efficiency of the device. Such information can be transmitted from the embedded energy monitoring device 105 to the energy monitoring device 100 along with an optional advice message for the user. For example, in a refrigerator as the compressor ages, the embedded energy monitor 105 can detect the changes in the load signature as the compressor turns on or off and report it via the energy monitor 100. An Energy Aware Appliance whose appliance functionality is implemented with a controller, can interface the appliance controller to the embedded energy monitoring device 105 to inform the energy monitor that the appliance is changing state in operating state of the Energy Aware Appliance. For example, the appliance controller of a washing machine can inform the embedded energy monitoring controller that the machine is transitioning to the state "rinse cycle of large laundry load". In response, the embedded energy monitoring device can make appropriate load signature computations. Interfacing the embedded energy monitoring device to the appliance controller greatly reduces the computations and error probability for determining the electrical device, the state, and the load signature for the state because the electrical device identity and state are given to the embedded energy monitoring device by the appliance controller. The Energy Aware Appliance architecture also greatly increases the accuracy and automation of an energy monitor system because the user does not need to confirm the device and state, and the embedded energy monitoring device 105 can select a load signature algorithm which is appropriate for the known device and state, and approximate load. Using the Energy Aware Appliance Protocol, described below, the embedded energy monitoring device 105 can then inform the energy monitoring device 100 of the electrical device, the state, and the associated load signature calculated by the embedded energy monitoring device. A person of skill in the art would recognize that a manufacturer of an electrical device is in the best position to understand how their electrical device components will age and require service or replacement. Thus, the embedded energy monitoring device can have substantial custom logic added to the core embedded energy monitoring device functionality in order to give energy savings tips and advice to the user on repair and replacement of parts based on the manufacturer's specialized knowledge of their own appliance. Embedded energy monitors are further able to be embedded in power supply subsystems, such as might be found in a home entertainment system, a computer, or other contemporary electronics device.

Energy Aware Appliance Protocol

An Energy Aware Appliance enhances the energy monitoring functionality because it is (1) able to monitor its own electrical condition utilizing the embedded energy monitoring device functionality, and (2) the energy monitoring device 100 does not need to determine the identity of the Smart Device, or the state in which it is operating, because both pieces of information are known to the Energy Aware Appliance and need only to be transmitted to the embedded energy monitoring device 105, then relayed to the energy monitoring device 100. As discussed above, the embedded energy monitoring device 105 could alternatively send the load signature, along with the state and device identifier, to the energy monitoring device 100, thereby eliminating the step of having the user confirm the device identification and the state. The manufacturer of the Energy Aware Appliance is also able to interface control of the operating states to the embedded energy monitoring device 105 such that control of the Energy Aware Appliance is possible via the energy monitoring device 100. For example, an Energy Aware Appliance oven, whose control was interfaced to the embedded energy monitoring device 105 can inform the user that the oven has been left on for two hours or more. A message can be generated either from the Energy Aware Appliance, or the embedded energy monitoring device 105, and routed to the energy monitoring device 100, then to the user's cell phone via text message. The user is able to text message back to the energy monitoring device 100 "OVEN OFF", the energy monitoring device 100 can forward the commands to the embedded energy monitoring device 105, and on to the Energy Aware Appliance, turning off the oven.

Energy Aware Appliance Protocol commands are able to originate from the energy monitoring device 100, the embedded energy monitoring device 105, and to the extent that a manufacturer of an Energy Aware Appliance supports it, from the Energy Aware Appliance. As described below, the commands are able to have the following general format. One skilled in the art will recognize that the functionality disclosed may be implemented in a variety of ways.

TABLE 1

| Start | From device | To device | Command | Parameters | Stop |
| --- | --- | --- | --- | --- | --- |

Start, Stop—The Start and Stop fields can comprise any character or bit pattern distinguishable for other data in the command packet.

From device, To device—These may be unique identifiers such as an IP address, or other unique identification of the source and destination devices. Each Energy Aware Appliance, embedded energy monitoring device 105 within the Energy Aware Appliance, and the energy monitoring device 100 are able to have unique addresses to support commands. A generic identifier, such as "ALL" can be used to address a global command to all connected devices.

Command—The following is a small command set which can be used to implement the functionality described above. One skilled in the art would recognize that many commands could be added, and some deleted, without deviating from the functionality disclosed herein.

Parameters—Parameters are able to be command-specific, including a plurality of parameters as described below. Some commands are able to implement their functionality without any parameters.

In the following list of commands, EMD refers to the energy monitoring device 100, EEMD.x refers to an embedded energy monitoring device 105, and SA refers to an Energy Aware Appliance, coupled to its EEMD.x 105. Most commands can be sent by the EMD to an EMD.x or SA, or by the EEMD.x to its associated SA. One skilled in the art of embedded system design will recognize that an appliance controller with a stored load signature table is able to use many of the following commands to directly interface to the energy monitoring device without requiring the appliance to have and embedded energy monitoring device.

Commands:

Return Device Description—This command returns description information from the destination device. Description information can comprise the textual description, IP address other unique identifier, the manufacturer, model, nominal voltage, maximum amperage, or other device information.

Return State List—This command returns the list of states for the SA, for associating a load signature with the device and state. Returning the list of states permits the EMD and/or the EEMD.x to know the list of states, rather than discover them through monitoring, presentation to the user, and confirmation by the user.

Return Load Signature—This command returns a load signature for a device for a state of that device. Parameters include the state for which a load signature is requested, and the source for obtaining the load signature. A source can be the factory, generic, default load signature for each state, a load signature based upon testing lab results, or actual load signatures obtained by the embedded energy monitoring device in the Energy Aware Appliance.

Return SA Command List—This command returns a list of commands, descriptions, and parameters exposed to the EEMD.x by the SA when the SA is interfaced to the controller of the electrical device in which the EEMD.x is embedded.

Return Software Revision—This command returns the current software revision level of the destination device. The command can be used to query the software revision level of a device in order to determine whether a software upgrade is appropriate and to determine the functionality supported by the installed software, from its revision level.

Execute Energy Aware Appliance Command—This very powerful command enables the energy monitoring device to perform a controlled recovery after a power outage, described below, manage energy usage for reducing energy costs and consumption based on time-of-day, current or anticipated load, and to effect remote control of devices inadvertently left on.

Return Current State—This command can be used in conjunction with the Execute Energy Aware Appliance Command to assist in implementing the functionality described above.

Set Software Revision—This command downloads an upgrade of software to the destination device.

Query for Devices—This command allows the energy monitoring device 100, or an embedded energy monitoring device 105, to query for whether there are other energy monitoring devices, embedded or otherwise, connected to the network, and to obtain the addresses of such devices. Through one or more of the above commands, an energy monitoring device, embedded or otherwise, is able to determine the capability of connected energy monitoring devices.

One skilled in the art would recognize that this minimal command set can be easily expanded within the teachings disclosed herein.

Controlled Recovery after a Power Outage

After a power outage, it is desirable to have a controlled recovery of electrical devices to their previous state, or other determined state. Without a controlled recovery, all devices which had a previous state other than "OFF" could begin drawing power as soon as power was restored after the outage, unless their internal control electronics, if any, were programmed otherwise. As discussed above, particularly with regard to electrical devices with complex operating states and those with high energy usage, it is desirable to control the recovery after a power outage in a manner which does not draw too much current and which safely brings the electrical devices back on line to a safe operating state. For example, if a power saw was "ON" in the garage during a power outage, it can be prevented from restarting after power is restored and can require manual action by the user to restart it. The refrigerator can be given priority in order to preserve food from spoilage. If a power goes out for a long time on a hot day, the clothes in a laundry cycle can be re-washed rather than resuming the wash cycle in progress when the power went out, thereby avoiding possible mildew problems. The energy monitoring device is able to hold devices in the OFF state, and control restart by holding all Energy Aware Appliances in the OFF state until each appliance is commanded to restart by the energy monitoring device 100, via the embedded energy monitoring device(s) 105 in the Energy Aware Appliances. The sequence can be predetermined by the energy monitoring device 100, by a user-created sequence of steps, in accordance with manufacturer's recommendations, or a combination of these. Energy Aware Appliances which interface their controllers and control commands to the embedded energy monitoring device can implement such recovery logic.

Artificial Intelligence

Usage Patterns, Optimization

As described above, the energy monitoring device date/time stamps the energy usage it monitors, and further associates the usage with one or more devices, each device having a state. As described above, the energy monitoring device 100 has access to the tariff schedules which form the basis for reporting the cost of the energy usage monitored by the energy monitoring device. Thus, the energy monitoring device, or a remote device with data logging capabilities such as a personal computer 310, is able to analyze patterns in energy usage to determine whether cost savings can be had by changing energy usage patterns. For example, the data can be analyzed to determine whether the energy user usually washes and dries their clothes at peak usage hours, thereby triggering a higher tariff rate. A different time, with a lower tariff rate, can be suggested to the user, along with an estimate of the cost savings for following the advice. The usage patterns can also be used to forecast future energy costs based on past usage, based upon one or more tariff rate schedules. Forecasts can be for an hour, a day, a week, a month, a quarter, a year, or a season.

Complex, yet repetitive, electrical devices such as washing machines, dishwashers, and heaters which operate on a cycle are able to produce a repetitive sequence of load signatures. A load signature sequence is able to be named and stored in a local memory of the energy monitoring device, remote display device, or data logging device. For example, "Washing Machine, Large Load, Fill Cycle" could be a name to refer to a sequence of load signatures comprising signatures for turning on a water fill valve, actuating a fill level switch, and turning off the water fill valve.

Appliance Setting Optimization

Usage pattern information, in conjunction with load signature information, can be used to optimize appliance settings, such as for a refrigerator. The user selects an appliance to optimize, and enters the adjustment parameter, its unit, the minimum and maximum values, parameter increment, the test duration, and test period and the period increment. For example, "Refrigerator, temperature, F.°, 25°, 35°, 1°, 3 hours, 30 minutes". Over the period of the test, the energy meter measures the energy consumed at each incremental setting for display to the user, along with forecasted costs for each setting value, for a forecast period of time such as a month or a year.

DC Applications and Self-Power

The above devices can be used in a direct current (DC) electrical environment such as in a hybrid-car or where a user has a self-powered electrical system such as a generator, solar panels, or wind turbine generator. The energy monitoring device is able to monitor the power generated by self-power systems. The energy monitoring device is able to advise the user when to reschedule his energy usage, in conjunction with self-power generation, in order to optimize delivery of self-generated power to the grid, thereby maximizing his energy savings based on a time-of-day tariff schedule. For DC applications, certain measurements which do not logically apply to load signature calculations for DC devices can be omitted, such as cos(phi), phase voltage, and phase current. The energy monitoring device is able to measure and compute DC load signatures in accordance with the above described algorithms, modified for DC applications.

Graphical User Interface

The energy monitoring device systems and methods of the presently claimed invention produced very detailed energy usage information for each state of each device in an network of devices in a household or small business. The energy monitoring information is able to be aggregated at multiple levels for a wide variety of purposes. One or more applications having a graphical user interface, running on a remote display device having graphical display capabilities, such as a SmartPhone (iPhone, Droid, Blackberry, et al), a cell phone, a personal digital assistant, or a portable computer are able to provide query, display, and optimization tools using the detailed energy monitoring information.

The Prius Effect

Energy usage is reduced when a user becomes aware of how much energy they are using, when they are using it, what they are paying for it, and the purpose for which the energy was used (the Prius Effect). The energy monitoring device of the presently claimed invention is able to time stamp energy usage information such that the energy usage information is able to be aggregated, for display on a graphical user interface device (GUI). The cumulative energy usage for a home or small business is able to be presented to the energy user by year, season, month, day, week, day, hour, minute or second, depending on the level of data zooming in the GUI application. Energy usage is further able to be aggregated for display by electrical device, broken down by any of the above time periods. The energy usage information is further able to be broken down by the various states of a device by further zooming in on the usage information of a specific device.

One state which many modern devices have, particularly devices which are powered by a controller, is a STANDBY state. The purpose of a STANDBY state is to bring a device to a power ON condition in a quicker time than if the device were brought to power ON from the power OFF state. Devices in the STANDBY state, therefore, consume power. Often, a device in the STANDBY state appears, visually, to be in the OFF state. Thus, a user visually inspecting devices to shut them off to save energy would overlook devices in the STANDBY state. The energy monitoring device of the presently claimed invention is able to track energy usage at the state level, by the time breakdowns described above. Thus, a user is able to determine their energy usage, by device, for devices consuming power in the STANDBY state.

Utilizing the additional tables or lists in the private database, described above, an energy user is also able to determine the usage of energy by room, and by therefore by user, as well as by time, by device and by state of a device. A GUI according to some embodiments displays a map of the user's home or small business, with energy usage for a selected time period displayed for each room. Alternatively, or in addition, a GUI-based application according to some embodiments displays energy usage for a selected time period based on the user assigned to a room in the home or small business. GUI-based analysis applications are able to compare energy usage between different time periods. For example, energy usage for heating in the winter and energy usage for cooling in the summer are able to be compared. Energy usage is able to be display by KWH, by dollars, by BTU's or other units supported by a conversion module and a tariff table.

Improving Grid Quality

During computation of the load signatures, as part of the normal operation of an energy monitoring device according to some embodiments, the quality of the electrical network, including power factor percentage, noise, and distortion in the spectral content of one or more computed parameters. This energy monitoring information is able to be used in conjunction with power factor correction systems and methods, as disclosed in U.S. Provisional Patent Application Ser. No. 61/206,501, filed Jan. 26, 2009 and entitled "POWER FACTOR AND HARMONIC CORRECTION METHODS", under 35 U.S.C. §119(e), and U.S. Provisional Patent Application Ser. No. 61/298,112, filed Jan. 25, 2010 and titled "POWER FACTOR AND HARMONIC CORRECTION METHODS", under 35 U.S.C. §119(e) both of which are incorporated by reference.

Appliance Repair Advisor

As an appliance ages, the load signature(s) for one or more states can change. For example, as the bearings of a pump age, the in-rush current for a motor in a dishwasher, refrigerator, washer, dryer, or HVAC fan would change compared with the load signature when the appliance was new. Correlations of specific defects to changes in load signature are able to be used to identify aging components in an appliance.

Cyclic Pattern Discovery

Energy users often use their energy consuming devices in a patterned way. An energy monitoring device is able to use load signature information, in conjunction time-stamped, past energy usage information to assist in learning devices and their states. For example, on Monday through Friday, an energy user is likely to utilize an electric hot water heater, a shaver, one or more incandescent bulbs, and a coffee maker all within a narrow window of time. Correlation of load signature with such patterned usage is able to increase the probability of successfully identifying a load. Such correlation is able to be used to in lieu or, or alternatively in addition to, second level load signature calculations in order to obtain greater reliability in load identification.

In operation, an energy monitoring device comprises an energy meter coupled to a power supply to a home or business, a controller, memory, and an optional display module and input module. A remote display device may be used instead of or in addition to, the display and input modules for displaying energy monitoring information. The energy monitoring device is located downstream of a power utility meter and a mains box, and upstream of the circuit breaker in the home or business, and upstream of the electrical devices to be monitored. Each electrical device coupled to the power supply has one or more states associated with the electrical device. Simple examples of electrical device states include ON, OFF, STANDBY, and HALF-POWER. When an electrical device changes states, a comparison of the power supply measurements successively read by the energy meter will indicate the change of state of the electrical device. Additional power supply parameters can be computed and/or sampled from additional energy meter readings. A load signature for the electrical device, and its associated state, is a collection of parameters characterizing an electrical device in a state. The load signature is looked up in a private, and/or a public, database of load signatures, depending upon the specific configuration and equipment installed in the energy monitoring device. During a learning phase, if the load signature is found, it is presented to the user on a display device. Otherwise, a nearest matching load signature and state is presented to the user. The user then edits or accepts the identification of the device and the state, and the load signature, electrical device identification and state are stored in the private load signature database. The learning phase can be improved by pre-loading certain information regarding devices, states, and rooms in the network of electrical devices to be monitored. For example, a user can program the energy monitoring device to associate rooms in the building with the electrical devices to be monitored are located, the known electrical devices in each room of the structure, a list of states which the electrical devices can use, and energy users in the building. The energy monitoring device can further be programmed to associate rooms with electrical devices installed in those rooms, and correlating electrical devices with states. In some embodiments, the energy monitoring device can receive a unique identifier to correlate with an electrical device to be monitored for looking up the load signature of the electrical device in a public database. The public database of load signatures is able to comprise a read-only database of load signatures such that users are not able to upload or otherwise alter the public load signature database. Alternatively, or as a supplement to the public load signature database, an open, public database can reside anywhere, including a well-known website host such as Google® or Yahoo®, or an interested party such as a public utility company or a state Public Utility Commission.

As new load signatures are computed, they are compared against the existing private database of load signatures. If a new load signature does not correlate with one in the private load signature database, it is compared to the public load signature database. A minimum correlation value, such as 80%, may be set to establish a filter to determine whether the newly computed load signature represents an existing load signature and state, which is changing over time, or whether the load signature in fact represents a new device and/or state. In some embodiments, the acceptance tolerance can be narrowed over time to reflect a higher confidence in the actual values acquired enabling better discrimination between similar loads.

Energy monitoring information is collected from successive energy meter readings, the computed power supply parameters, and the electrical devices and their states. The energy monitoring information may be stored locally, up to the limit of local memory, or transmitted to a remote display device or a personal computer for data logging and analysis. The energy monitoring information can be date/time stamped by a clock/calendar installed in the energy monitoring device, or by a clock/calendar function installed in the remote display device or personal computer receiving the energy information. Since electrical devices and their states and their usage can be identified and date/time stamped, energy information can be acquired and displayed on a device-by-device, moment-by-moment basis. Energy information can also be aggregated to show usage trends over time.

The energy monitoring device, or the remote device or personal computer, can store one or more utility tariff tables which correspond to tariffs available for selection by the user, or as defined by their electric utility. Analysis of energy monitoring information can then generate recommendations to the user as to which tariff rate schedule is more favorable on a cost basis. In embodiments where the energy monitoring system is coupled to the public utility via the Internet, the energy monitoring device can download new tariff tables as they become available, receive notifications of incentive programs, information regarding planned power outages, and other energy usage programs to lower energy usage costs.

In some embodiments, a user can receive notification of events from the energy monitoring device on a mobile device such as a cell phone, personal digital assistant or laptop computer. The message can be sent via the Internet, an SMS message, a voice mail, an email, or other communication medium. Examples of events include notification of an power outages, notice that the current energy usage has triggered a next higher tariff rate, or notification of an unusual usage pattern inconsistent with past trend information.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications are able to be made in the embodiment chosen for illustration without departing from the spirit and scope of the invention as defined by the claims. For example, the presently claimed invention has been described for use with a home or small business. One skilled in the art will readily recognize that the presently claimed invention is also able to be adapted to multiple residences, such as an apartment building or duplex, with multiple residential units and a single, central, power supply source. The methods and systems disclosed in the presently-claimed invention are able to be applied to a broad range of electrical configurations including, but not limited to, single-phase 3-wire with phase, counter phase and neutral; single-phase 3-wire with phase, counter phase and no neutral; 4-wire with three phases and a neutral; dual phase 3-wire with phase 1, phase 2 and neutral: off-grid AC; off-grid DC; and power generation sources such as solar-panels, generators, and co-generators appearing as a negative in a network of electrical devices coupled to a grid power supply as a primary power source.

What is claimed is:

1. An energy monitoring device coupleable to a power supply, the energy monitoring device programmed to identify the presence and a state of an electrical device coupled to the power supply of a plurality of electrical devices coupled to the power supply, based on a load signature computed from a change in successive samples of the power supply measured by the energy monitoring device taken at a point upstream of the electrical device to be monitored, wherein each sample comprises a plurality of values associated with a plurality of measured power supply parameters.

2. The energy monitoring device of claim 1, wherein the programmed device comprises at least one of: selected and interconnected discrete components, a microprocessor, an application specific integrated circuit (ASIC), a mixed mode integrated circuit, a system on a chip, a programmed field programmable gate array (FPGA), and one or more configured and interconnected integrated circuits.

3. The energy monitoring device of claim 1, wherein the state of the electrical device is one of on, off, standby, power up, power down, a percentage of full power, and a named sequence of states.

4. The energy monitoring device of claim 1, further comprising a display device, a user input device, and a user interface software.

5. The energy monitoring device of claim 4, wherein the display device and the user input device and the user interface software are implemented on a consumer electronic device.

6. The energy monitoring device of claim 5, wherein the consumer electronic device is one from the group consisting of: an iPhone, a cell phone, a SmartPhone, a personal digital assistant, a portable computer, a desktop computer.

7. The energy monitoring device of claim 1, wherein identifying the electrical device and the state comprises computing a load signature for the electrical device from the change in successive samples of the power supply.

8. The energy monitoring device of claim 7, wherein the load signature corresponding to the electrical device and the state comprises one or more of phase voltage, phase current, neutral voltage, neutral current, apparent power, cos(phi), active energy, reactive energy, frequency, period, over/under-voltage conditions, percentage of power factor, RMS current, instantaneous current, RMS voltage, instantaneous voltage, current harmonic THD percentage, voltage harmonic THD percentage, spectral content of the current waveform, spectral content of the voltage waveform, spectral content of the active power waveform, spectral content of the reactive power waveform, quality of the network percentage, time, date, temperature, and humidity.

9. The energy monitoring device of claim 7 wherein the computed load signature is associated with the electrical device and its state, and stored in a memory.

10. The energy monitoring device of claim 7, wherein identifying the electrical device and the state comprises looking up the load signature in a memory.

11. The energy monitoring device of claim 10, wherein the memory comprises a plurality of pre-stored load signatures.

12. The energy monitoring device of claim 1, further comprising a communications module communicatively coupled to a remote device via a network.

13. The energy monitoring device of claim 12, wherein energy monitoring information is transmitted to at least one of the energy monitoring device display module, and a remote device.

14. The energy monitoring device of claim 13, wherein the energy monitoring information comprises one of electrical device information, power usage information, electrical network information, user advice, and power utility information.

15. The energy monitoring device of claim 14, wherein electrical device information comprises one of an identifier of an electrical device in the plurality of electrical devices, the state of the electrical device, the load signature data of the device, and the power utilization associated with the device.

16. The energy monitoring device of claim 14, wherein the power usage information comprises at least one of aggregate power consumption information, energy, current, power factor, and total harmonic distortion (THD).

17. The energy monitoring device of claim 14 wherein the electrical network information comprises one of weak power factor, weak THD, noisy grid, and circuit performance.

18. The energy monitoring device of claim 14, wherein the user advice comprises one of informing the user of a current daily, weekly, or monthly bill, how to reduce the bill, bill information categorized by electrical device, how to improve power factor, how much standby power is consumed, when to replace old or inefficient appliances, what time of day to schedule device usage to lower the bill, detection and advice of an interruption to the utility power, and prediction as to future energy usage based upon past usage patterns.

19. The energy monitoring device of claim 1, further comprising a thermostat module.

20. The energy monitoring device of claim 19, wherein the thermostat module is coupled to one from the group consisting of: a heater, an air conditioner, and an HVAC system.

21. A method of identifying an electrical device coupled to a power supply, and a state of the electrical device, comprising:
    receiving, by an energy monitoring device, a first plurality of values associated with a plurality of measured power supply parameters;
    receiving, by the energy monitoring device, a second plurality of values associated with the plurality of measured power supply parameters;

detecting a change between the first value and the second value associated with at least one power supply parameter;

computing a load signature for the electrical device based upon the first and second values associated with the plurality of measured power supply parameters; and looking up the load signature of the electrical device in a memory, wherein the load signatures stored in the memory are associated with an electrical device identifier and a state of the electrical device associated with the load signature, thereby identifying an electrical device coupled to a power supply, and a state of the electrical device.

22. The method of claim 21, wherein detecting a change in at least one power supply parameter comprises detecting a change in one of the active power, the reactive power, the apparent power, and the RMS current.

23. The method of claim 21, further comprising receiving additional power supply parameters after detecting the change in at least one power supply parameter, and before computing the load signature for the electrical device and the state.

24. The method of claim 21, wherein measuring a plurality of power supply parameters comprises measuring one of phase voltage, phase current, neutral voltage, neutral current, apparent power, cos(phi), period, frequency, active power, active energy, reactive energy, reactive power, frequency, period, over/under-voltage conditions, temperature, and humidity.

25. The method of claim 21, wherein the state of an electrical device is one of on, off, standby, power up, power down, a percentage of full power, and a named sequence of states.

26. The method of claim 21, wherein a load signature comprises one of phase voltage, phase current, neutral voltage, neutral current, apparent power, cos(phi), active power, active energy, reactive power, reactive energy, frequency, period, over/under-voltage conditions, percentage of power factor, RMS current, instantaneous current, RMS voltage, instantaneous voltage, current harmonic THD percentage, voltage harmonic THD percentage, reactive power harmonic THD percentage, active power harmonic THD percentage, spectral content of the current waveform, spectral content of the voltage waveform, spectral content of the active power waveform, spectral content of the reactive power waveform, quality of the network percentage, time, date, temperature, and humidity.

27. The method of claim 21, wherein computing the load signature for the electrical device and the state comprises the steps:

computing the active power, P, as the difference between the active power in the first power supply parameters and the active power in the second power supply parameters;

computing the reactive power, Q, as the difference between the reactive power in the first power supply parameters and the reactive power in the second power supply parameters;

computing the apparent power, S, according to the equation $S=\mathrm{sqrt}(P^2 + Q^2)$, wherein "sqrt" means "square root";

computing the current, I, according to the equation $I=S/V$, wherein V is the nominal voltage of the power supply;

computing the active power harmonic THD, THD_P, according to the equation $\mathrm{THD\_P} = (P - P\_FUND)/P\_FUND$, wherein P is the active power of the power supply and P_FUND is the fundamental active power (all harmonic frequencies removed);

computing the reactive power harmonic THD, THD_Q, according to the equation $\mathrm{THD\_Q} = (Q - Q\_FUND)/Q\_FUND$, wherein P is the active power of the power supply and P_FUND is the fundamental active power (all harmonic frequencies removed); and computing the power factor, PF, according to the equation $PF=S/P$.

28. The method of claim 21, further comprising transmitting energy monitoring information to one of a display device, and a remote device.

29. The method of claim 28, wherein energy monitoring information comprises one of electrical device information, power usage information, electrical network information, user advice, and power utility information.

30. The method of claim 29, wherein electrical device information comprises one of an identifier of an electrical device in the plurality of electrical devices, the state of the electrical device, the load signature data of the device, and the power utilization associated with the device.

31. The method of claim 29, wherein the power usage information comprises at least one of aggregate power consumption information, energy, current, power factor, and total harmonic distortion (THD).

32. The method of claim 29 wherein the electrical network information comprises one of weak power factor, weak THD, noisy grid, and circuit performance.

33. The method of claim 29, wherein user advice comprises one of informing the user of a current daily, weekly, or monthly bill, how to reduce the bill, bill information by categorized by electrical device, how to improve power factor, how much standby power is consumed, when to replace old or inefficient appliances, prediction of future power bills based upon past power usage, what time of day to schedule device usage to lower the bill, detection and advice as to utility power interruption.

34. The method of claim 29, wherein power utility information comprises one of a tariff change, a planned power outage, an imminent power cut-off, a bill due, a suggestion as to how to reduce power bill costs, an incentive offer, a power bill, and an estimated forecast power bill.

35. The method of claim 28, wherein energy monitoring information is presented to the user by an application running on a consumer electronic device from the group consisting of: an iPhone, a cell phone, a SmartPhone, a personal digital assistance, a portable computer, and a desktop computer.

36. A method of creating a database of load signatures for a plurality of electrical devices coupled to a power network having a plurality of states, the method comprising:

measuring, by an energy monitoring device, a first plurality of values associated with a plurality of measured power supply parameters of an electrical device coupled to the power network, wherein the electrical device is in a first state;

measuring, by the energy monitoring device, a second plurality of values associated with the plurality of measured power supply parameters;

detecting a change of state of the electrical device from the first state to a second state utilizing the first and second plurality of values associated with the plurality of measured power supply parameters;

computing a load signature from the first and second plurality of values associated with the plurality of measured power supply parameters; and storing a database record comprising the load signature, the second state, and an identifier for the electrical device, thereby creating a database of load signatures for a plurality of electrical devices having a plurality of states.

37. The method of claim 36, wherein the first state is OFF and the second state is ON.

38. The method of claim 36, further comprising the steps:
looking up the load signature in a database to determine a nearest matching electrical device and state, after computing the load signature;
presenting the nearest matching electrical device and state to a user for confirmation of the electrical device and state; and
accepting user changes to at least one of the electrical device and state in a database record further comprising the load signature, if the user changes the electrical device or state.

39. The energy monitoring device of claim 1, wherein the plurality of measured parameters are measured at the same time.

* * * * *